US012639932B2

(12) United States Patent
Hosseinzadeh Taher et al.

(10) Patent No.: US 12,639,932 B2
(45) Date of Patent: May 26, 2026

(54) SYSTEMS, METHODS, AND APPARATUSES FOR LEARNING FOUNDATION MODELS FROM ANATOMY IN MEDICAL IMAGING FOR USE WITH MEDICAL IMAGE CLASSIFICATION AND SEGMENTATION

(71) Applicant: Arizona Board of Regents on behalf of Arizona State University, Scottsdale, AZ (US)

(72) Inventors: Mohammad Reza Hosseinzadeh Taher, Tempe, AZ (US); Jianming Liang, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 289 days.

(21) Appl. No.: 18/528,675

(22) Filed: Dec. 4, 2023

(65) Prior Publication Data

US 2024/0290076 A1 Aug. 29, 2024

Related U.S. Application Data

(60) Provisional application No. 63/430,219, filed on Dec. 5, 2022.

(51) Int. Cl.
*G06V 10/774* (2022.01)
*G06T 7/00* (2017.01)

(52) U.S. Cl.
CPC .......... *G06V 10/774* (2022.01); *G06T 7/0012* (2013.01); *G06V 2201/03* (2022.01)

(58) Field of Classification Search
CPC . G06V 10/774; G06V 2201/03; G06T 7/0012
See application file for complete search history.

(56) References Cited

U.S. PATENT DOCUMENTS 11,436,725 B2 9/2022 Hosseinzadeh Taher et al.
2021/0015554 A1* 1/2021 Chow .................. G06N 3/0895
(Continued)

OTHER PUBLICATIONS

Xu, Y., et al, "RegionCL: Exploring Contrastive Region Pairs for Self-supervised Representation Learning," European Conference on Computer Vision—ECCF 2022, pp. 477-494.
(Continued)

*Primary Examiner* — Casey L Kretzer
(74) *Attorney, Agent, or Firm* — Elliott, Ostrander & Preston, P.C.

(57) ABSTRACT

Human anatomical structures are extracted from medical images. A foundation model is generated by learning the human anatomical structures, resulting in generic representations of the human anatomical structures. The human anatomical structures are learned by executing a self-supervised contrastive learning framework to conserve hierarchical relationships of the human anatomical structures in the medical images and to capture distinct representations for different human anatomical structures at different granularity levels. The self-supervised contrastive learning framework executes an anatomy decomposer (AD) to conserve hierarchical relationships of the human anatomical structures in the received medical images and executes a purposive pruner (PP) to capture distinct representations for different human anatomical structures at different granularity levels. Medical images that form no part of the received medical images may then be processed using the trained foundation model.

9 Claims, 19 Drawing Sheets

(56) References Cited

U.S. PATENT DOCUMENTS

| | | | |
|---|---|---|---|
| 2021/0265043 A1 | 8/2021 | Haghighi et al. | |
| 2021/0375435 A1* | 12/2021 | O'Connor | G16H 30/20 |
| 2022/0180126 A1* | 6/2022 | Yan | G06T 7/70 |
| 2022/0328189 A1 | 10/2022 | Zhou et al. | |
| 2022/0351367 A1 | 11/2022 | Di Grandi | |
| 2024/0338932 A1 | 10/2024 | Hosseinzadeh Taher et al. | |

OTHER PUBLICATIONS

Yan, K., et al, "SAM: Self-Supervised Learning of Pixel-Wise Anatomical Embeddings in Radiological Images," IEEE Transactions on Medical Imaging, vol. 41, No. 10, 2022, pp. 2658-2669.

Yang, C., et al, "Instance Localization for Self-Supervised Detection Pretraining," Proceedings of the IEEE/CVF Conference on Computer Vision and Pattern Recognition (CVPR), 2021, pp. 3986-3995.

Ye, M. et al., "Unsupervised Embedding Learning via Invariant and Spreading Instance Feature," Proceedings of the IEEE /CVF Conference on Computer Vision and Pattern Recognition, 2019, pp. 6203-6212.

Zbontar, J. et al., "Barlow twins: Self-supervised learning via redundancy reduction," arXiv:2103.03230v3 [cs.CV], 2021, 13 pages.

Zhang, T., et al, "Leverage Your Local and Global Representations: A New Self-Supervised Learning Strategy," Proceedings of the IEEE/CVF Conference on Computer Vision and Pattern Recognition (CVPR), 2022, pp. 16580-16589.

Zhang, X. et al., "SAR: Scale-Aware Restoration Learning for 3d Tumor Segmentation," Medical Image Computing and Computer Assisted Intervention—MICCAI 2021: 24th International Conference, Strasbourg, France, Sep. 27-Oct. 1, 2021, Proceedings, Part II, 2021, Springer International Publishing, pp. 124-133.

Zhou, H.Y. et al., "Comparing to Learn: Surpassing ImageNet Pretraining on Radiographs by Comparing Image Representations," Medical Image Computing and Computer Assisted Intervention—MICCAI 2020: 23rd International Conference, Lima, Peru, Oct. 4-8, 2020, Proceedings, Part I, 2020, Springer International Publishing, pp. 398-407.

Zhou, H.Y. et al., "Preservational Learning Improves Self- supervised Medical Image Models by Reconstructing Diverse Contexts," Proceedings of the IEEE/CVF International Conference on Computer Vision, 2021, pp. 3479-3489.

Zhou, Z., et al, "Models Genesis," Medical Image Analysis, vol. 67, 101840 (2021), 23 pages.

Jing, L., et al., "Self-Supervised Visual Feature Learning with Deep Neural Networks: A Survey," IEEE Transactions on Pattern Analysis and Machine Intelligence, vol. 43, No. 11, 2021, pp. 4037-4058.

Kaku, A., et al, "Intermediate Layers Matter in Momentum Contrastive Self Supervised Learning," Advances in Neural Information Processing Systems, vol. 34, 2021, pp. 24063-24074.

Larsson, G. et al., "Colorization as a Proxy Task for Visual Understanding," In Proceedings of the IEEE Conference on Computer Vision and Pattern Recognition, 2017, pp. 6874-6883.

Li, J., et al, "Prototypical Contrastive Learning of Unsupervised Representations," International Conference on Learning Representations, arXiv:2005.04966v5 [cs.CV], 2021, 16 pages.

Lian, J., et al, "A Structure-Aware Relation Network for Thoracic Diseases Detection and Segmentation," IEEE Transactions on Medical Imaging, vol. 40, No. 8, 2021, pp. 2042-2052.

Liu, Z. et al., "Swin Transformer: Hierarchical Vision Transformer Using Shifted Windows," Proceedings of the IEEE/ CVF International Conference on Computer Vision (ICCV), 2021, pp. 10012-10022.

Loshchilov, I., et al, "SGDR: Stochastic Gradient Descent with Warm Restarts," arXiv preprint arXiv:1608.03983v2 [cs.LG], (2016), 9 pages.

Manjoo, F., "How Do You Know a Human Wrote This," The New York Times (2020), 3 pages.

Manning, C.D., et al, "Emergent linguistic structure in artificial neural networks trained by self-supervision," Proceedings of the National Academy of Sciences, vol. 117, No. 48, 2020, pp. 30046-30054.

Nguyen, H.C., et al, "VinDr-RibCXR: A Benchmark Dataset for Automatic Segmentation and Labeling of Individual Ribs on Chest X-rays," Medical Imaging with Deep Learning, 2021, 3 pages.

Nguyen, H.Q., et al, "VinDR-CXR: An open dataset of chest X-rays with radiologist's annotations," Scientific Data, vol. 9, Article 429 (2022), 7 pages.

Noroozi, M. et al., "Unsupervised Learning of Visual Representations by Solving Jigsaw Puzzles," European Conference on Computer Vision, 2016, Springer International Publishing, pp. 69-84.

Ouyang, X., et al, "Learning Hierarchical Attention for Weakly-Supervised Chest X-Ray Abnormality Localization and Diagnosis," IEEE Transactions on Medical Imaging, vol. 40, No. 10, 2021, pp. 2698-2710.

Pathak, D. et al., "Context Encoders: Feature Learning by Inpainting," 2016 Proceedings of the IEEE Conference on Computer Vision and Pattern Recognition (CVPR), pp. 2536-2544, https://doi.org/10.1109/CVPR.2016.278.

Pinheiro, P.O.O., et al, "Unsupervised Learning of Dense Visual Representations," Advances in Neural Information Processing Systems, vol. 33, 2020, pp. 4489-4500.

Radford, A., et al, "Learning Transferable Visual Models from Natural Language Supervision," Proceedings of the 38th International Conference on Machine Learning, vol. 139 of Proceedings of Machine Learning Research, 2021, pp. 8748-8763.

Rajpurkar, P. et al., "CheXNet: Radiologist-Level Pneumonia Detection on Chest X-Rays with Deep Learning," arXiv preprint arXiv:1711.05225v3 [cs.CV], 2017, 7 pages.

Ramesh, A., et al, "Zero-Shot Text-to-Image Generation," Proceedings of the 37th International Conference on Machine Learning, PMLR, vol. 139, 2020, 11 pages.

Ronneberger, O. et al., "U-Net: Convolutional Networks for Biomedical Image Segmentation," Medical Image Computing and Computer-Assisted Intervention—MICCAI 2015: 18th International Conference, Munich, Germany, Oct. 5-9, 2015, Proceedings, Part III, Springer International Publishing, pp. 234-241.

Saharia, C., et al, "Photorealistic Text-to-Image Diffusion Models with Deep Language Understanding," Advances in Neural Information Processing Systems (NeurIPS 2022), vol. 35, pp. 36479-36494.

Sellergren, A.B., et al, Simplified Transfer Learning for Chest Radiography Models Using Less Data, Radiology, vol. 305, No. 2, 2022, pp. 454-465.

Selvaraju, R. R. et al, "Grad-CAM: Visual Explanations from Deep Networks via Gradient-based Localization," In Proceedings of the IEEE International Conference on Computer Vision, 2017, pp. 618-626.

Shiraishi, J., et al, "Development of a Digital Image Database for Chest Radiographs with and Without a Lung Nodule: Receiver Operating Characteristic Analysis of Radiologists' Detection of Pulmonary Nodules," American Journal of Roentgenology, vol. 174, Issue 1, 2000, pp. 71-74.

Sowrirajan, H. et al, "MoCo-CXR: MoCo Pretraining Improves Representation and Transferability of Chest X-ray Models," Proceedings of Machine Learning Research MIDL 2021, vol. 143, pp. 728-744.

Strang, T., et al, "Using Gray codes as Location Identifiers," In: Geographisches Institut Der Universität Heidelberg Proceedings, vol. 1, 2009, pp. 135-143.

Sun, Y., et al, "Progressive decomposition: a method of coarse-to-fine image parsing using stacked networks," Multimedia Tools and Applications, vol. 79, No. 19, 2020, pp. 13379-13402.

Taher, M.R.H., et al, "CAID: Context-Aware Instance Discrimination for Self-supervised Learning in Medical Imaging," International Conference on Medical Imaging with Deep Learning (PMLR), vol. 172 (2022), pp. 535-551.

Taher, M.R.H., et al, "Learning from Anatomy in Chest Radiograph," MICCAI, 2023, 12 pages.

Taher, M.R.H., et al, "Towards Foundation Models Learned from Anatomy in Medical Imaging via Self-Supervision," MICCAI Work-

(56)  References Cited

OTHER PUBLICATIONS shop on Domain Adaptation and Representation Transfer. DART 2023. Lecture Notes in Computer Science, vol. 14293. Springer, Cham., 2023, pp. 94-104.

Taher, M.R.H., et al, "Towards Learning Foundation Models from Anatomy in Medical Imaging," CVPR 2023, 22 pages.

Taher, M.R.H., et al., "A Systematic Benchmarking Analysis of Transfer Learning for Medical Image Analysis," Domain Adaptation and Representation Transfer, and Affordable Healthcare and AI for Resource Diverse Global Health: Dart Fair 2021, Lecture Notes in Computer Science, vol. 12968, Springer International Publishing Cham (2021), pp. 3-13.

Tajbakhsh, N., et al, "Guest Editorial Annotation-Efficient Deep Learning: The Holy Grail of Medical Imaging," in IEEE Transactions on Medical Imaging, vol. 40, No. 10, 2021, pp. 2526-2533.

Tang, Y., et al, "Self-Supervised Pre-Training of Swin Transformers for 3D Medical Image Analysis," Proceedings of the IEEE/CVF Conference on Computer Vision and Pattern Recognition (CVPR), 2022, pp. 20698-20708.

Tao, X. et al., "Revisiting Rubik's Cube: Self-supervised Learning with Volume-Wise Transformation for 3D Medical Image Segmentation," arXiv:2007.08826v1 [eess.IV], 2020, 12 pages.

Thunström, A.O., "We Asked GPT-3 to Write an Academic Paper About Itself—Then We Tried to Get It Published," Scientific American, vol. 326, No. 6, 2022, 5 pages.

Tian, Y. et al., "What Makes for Good Views for Contrastive Learning?," Advances in Neural Information Processing Systems, vol. 33, 2020, pp. 6827-6839.

Tiu, E., et al, "Expert-level detection of pathologies from unannotated chest X-ray images via self-supervised learning," Nature Biomedical Engineering, vol. 6, No. 12, 2022, pp. 1399-1406.

Van den Oord, A. et al., "Representation learning with contrastive predictive coding," arXiv:1807.03748v2 [cs.LG], 2019, 13 pages.

Van der Maaten, L., et al, "Visualizing Data using t-SNE," Journal of Machine Learning Research, vol. 9, No. 11, 2008, pp. 2579-2605.

Van Ginneken, B., et al, "Segmentation of anatomical structures in chest radiographs using supervised methods: a comparative study on a public database," Medical Image Analysis, vol. 10, Issue 1, 2006, pp. 19-40.

Wang, X. et al., "ChestX-ray8: Hospital-scale Chest X-ray Database and Benchmarks on Weakly-Supervised Classification and Localization of Common Thorax Diseases," Proceedings of the IEEE Conference on Computer Vision and Pattern Recognition, 2017, pp. 3462-3471.

Wang, X. et al., "Dense Contrastive Learning for Self-Supervised Visual Pre-Training," In Proceedings of the IEEE/CVF Conference on Computer Vision and Pattern Recognition, 2021, pp. 3023-3032.

Wang., Z., et al, "Exploring Set Similarity for Dense Self-Supervised Representation Learning," Proceedings of the IEEE/CVF Conference on Computer Vision and Pattern Recognition (CVPR), 2022, pp. 16569-16578.

Wu, Z. et al., "Unsupervised Feature Learning via Non-Parametric Instance Discrimination," Proceedings of the IEEE Conference on Computer Vision and Pattern Recognition (CVPR), 2018, pp. 3733-3742.

Xiao, J., et al, "Delving Into Masked Autoencoders for Multi-Label Thorax Disease Classification," Proceedings of the IEEE/CVF Winter Conference on Applications of Computer Vision (WACV), 2023, pp. 3588-3600.

Xiao, T., et al, "Region Similarity Representation Learning," Proceedings of the IEEE/CVF International Conference on Computer Vision (ICCV), 2021, pp. 10519-10528.

Xie, E. et al., "DetCo: Unsupervised Contrastive Learning for Object Detection," Proceedings of the IEEE/CVF International Conference on Computer Vision, 2021, pp. 8372-8381.

Xie, Z. et al., "Propagate Yourself: Exploring Pixel-Level Consistency for Unsupervised Visual Representation Learning," Proceedings of the IEEE/CVF Conference on Computer Vision and Pattern Recognition, 2021, pp. 16679-16688.

Xie, Z. et al., "Self-Supervised Learning with Swin Transformers," arXiv reprint arXiv:2015.04553v2 [cs.CV] (2021), 8 pages.

Xie, Z. et al., "SimMIM: A Simple Framework for Masked Image Modeling," Proceedings of the IEEE/CVF Conference on Computer Vision and Pattern Recognition (CVPR), 2022, pp. 9653-9663.

"Huge "foundation models" are turbo-charging AI progress: They can have abilities their creators did not foresee," The Economist 2022, 16 pages.

"SIIM-ACR Pneumothorax Segmentation" (Online) (2019), https://www.kaggle.com/c/siim-acr-pneumothorax-segmentation/, 26 pages.

Azizi, S. et al., "Big self-supervised models advance medical image classification," Proceedings of the IEEE/CVF International Conference on Computer Vision, 2021, pp. 3478-3488.

Azizi, S., et al, "Robust and Efficient Medical Imaging with Self-Supervision," arXiv preprint arXiv:2205.09723v2 [cs.CV] (2022), 57 pages.

Bardes, A., et al, "VICReg: Variance-Invariance-Covariance Regularization for Self-Supervised Learning," ICLR 2022—International Conference on Learning Representations, Apr. 2022, Online, U.S. hal-03541297, 24 pages.

Bardes, A., et al, "VICRegL: Self-Supervised Learning of Local Visual Features," 36th Conference on Neural Information Processing Systems (NeurIPS 2022), 12 pages.

Bommanasani, R., et al, "On the Opportunities and Risks of Foundation Models," arXiv preprint arXiv:2108.07258v2 [cs.LG] (2021), 212 pages.

Brown, T.B., et al, "Language Models are Few-Shot Learnings," Advances in Neural Information Processing Systems, 2020, pp. 1877-1901.

Budai, A., et al, "Robust Vessel Segmentation in Fundus Images," International Journal of Biomedical Imaging, vol. 1, 2013, Article 154860, 11 pages.

Caron, M. et al., "Deep Clustering for Unsupervised Learning of Visual Features," In Proceedings of the European Conference on Computer Vision (ECCV), 2018, pp. 132-149.

Caron, M. et al., "Emerging Properties in Self-Supervised Vision Transformers," Proceedings of the IEEE/CVF International Conference on Computer Vision, pp. 9650-9660 (2021).

Caron, M. et al., "Unsupervised Learning of Visual Features by Contrasting Cluster Assignments," in Advances in Neural Information Processing Systems, vol. 33, 2020, pp. 9912-9924.

Chaitanya, K. et al., "Contrastive learning of global and local features for medical image segmentation with limited annotations," Advances in Neural Information Processing Systems vol. 33, 2020, pp. 12546-12558.

Chang, F., et al, "Boundary-Enhanced Self-supervised Learning for Brain Structure Segmentation," Medical Image Computing and and Computer Assisted Intervention, 2022, pp. 14-23.

Chen, L. et al., "Self-supervised learning for medical image analysis using image context restoration," Medical Image Analysis, vol. 58, 2019, 12 pages, https://doi.org/10.1016/j.media.2019.101539.

Chen, M., et al, "Generative Pretraining from Pixels," Proceedings of the 37th International Conference on Machine Learning, vol. 119, 2020, pp. 1691-1703.

Chen, R.J., et al, "Scaling Vision Transformers to Gigapixel Images via Hierarchical Self-Supervised Learning," Proceedings of the IEEE/CVF Conference on Computer Vision and Pattern Recognition (CVPR), 2022, pp. 16123-16134.

Chen, T. et al., "A Simple Framework for Contrastive Learning of Visual Representations," Proceedings of the 37th International Conference on Machine Learning, PMLR, vol. 119, 2020, pp. 1597-1607.

Chen, T. et al., "Big Self-Supervised Models are Strong Semi-supervised Learners," Advances in Neural Information Processing Systems (NeurIPS), vol. 33, 2020, pp. 22243-22255.

Chen, X. et al., "An Empirical Study of Training Self-supervised Vision Transformers," Proceedings of the IEEE/CVF International Conference on Computer Vision, 2021, pp. 9640-9649.

Chen, X. et al., "Exploring Simple Siamese Representation Learning," In Proceedings of the IEEE/CVF Conference on Computer Vision and Pattern Recognition (CVPR), 2021, pp. 15750-15758.

(56)        References Cited

OTHER PUBLICATIONS

Chen, X. et al., "Improved Baselines with Momentum Contrastive Learning," arXiv preprint arXiv:2003.04297v1 [cs.CV], 2020, 3 pages.

Cho, K., et al, "CheSS: Chest X-Ray Pre-trained Model via Self-Supervised Contrastive Learning," Journal of Digital Imaging, vol. 36, 2023, pp. 902-910.

Choe, J. et al., "Evaluating Weakly Supervised Object Localization Methods Right," Proceedings of the IEEE/CVF Conference on Computer Vision and Pattern Recognition, 2020, pp. 3130-3139.

Chuang, C.Y., et al, "Robust Contrastive Learning Against Noisy Views," Proceedings of the IEEE/CVF Conference on Computer Vision and Pattern Recognition (CVPR), 2022, pp. 16670-16681.

Cuadros, J., et al, "EyePACS: An Adaptable Telemedicine System for Diabetic Retinopathy Screening," Journal of Diabetes Science and Technology, vol. 3, Issue 3, 2009, pp. 509-516.

Devlin, J. et al., "BERT: Pre-training of Deep Bidirectional Transformers for Language Understanding," arXiv preprint arXiv:1810. 04805v2 [cs.CL], 2018, 16 pages.

Doersch, C. et al., "Unsupervised Visual Representation Learning by Context Prediction," Proceedings of the IEEE International Conference on Computer Vision, 2015, pp. 1422-1430, https://doi. org/10.1109/ICCV.2015.167.

Donahue, J. et al., "Large Scale Adversarial Representation Learning," Advances in Neural Information Processing Systems, vol. 32, 2019, 11 pages.

Dwibedi, D., et al, "With a Little Help from My Friends: Nearest Neighbor Contrastive Learning of Visual Representations," Proceedings of the IEEE/CVF International Conference on Computer Vision (ICCV), 2021, pp. 9568-9577.

Ermolov, A. et al., "Whitening for Self-Supervised Representation Learning," International Conference on Machine Learning, PMLR, 18-24, 2021, pp. 3015-3024.

Fu, Z., et al, "Anatomy-Aware Contrastive Representation Learning for Fetal Ultrasound," Computer Vision—ECCV 2022 Workshops, 2023, pp. 422-436.

Gazda, M., et al, "Self-Supervised Deep Convolutional Neural Network for Chest X-Ray Classification," IEEE Access, vol. 9, 2021, pp. 151972-151982.

Ghesu, F.C., et al, "Self-supervised Learning from 100 Million Medical Images," arXiv:2201.01283v1 [cs.CV], 2022, 13 pages.

Gidaris, S. et al., "Unsupervised Representation Learning by Predicting Image Rotations," arXiv preprint arXiv 1803.07728, 2018, 17 pages.

Gidaris, S., et al, "OBoW: Online Bag-of-Visual-Words Generation for Self-supervised Learning," 2021 Proceedings of the IEEE/CVF Conference on Computer Vision and Pattern Recognition, 2021, pp. 6830-6840.

Glocker, B., et al, "Risk of Bias in Chest Radiography Deep Learning Foundation Models," Radiology: Artificial Intelligence, vol. 5, No. 6, 2023, 10 pages.

Grill, J.B. et al., "Bootstrap Your Own Latent: A New Approach to Self-supervised Learning," Advances in Neural Information Processing Systems, vol. 33, 2020, pp. 21271-21284.

Haghighi, F. et al., "DiRA: Discriminative, Restorative, and Adversarial Learning for Self-Supervised Medical Image Analysis," In Proceedings of the IEEE/CVF Conference on Computer Vision and Pattern Recognition (CVPR), 2022, pp. 20824-20834.

Haghighi, F. et al., "Learning Semantics-enriched Representation via Self-discovery, Self-classification, and Self-restoration," Medical Image Computing and Computer Assisted Intervention— MICCAI 2020, Lecture Notes in Computer Science, vol. 12261, Springer International Publishing Cham (2020), pp. 137-147.

Haghighi, F. et al., "Transferable Visual Words: Exploiting the Semantics of Anatomical Patterns for Self-supervised Learning," IEEE Transactions on Medical Imaging, vol. 40, No. 10, 2021, pp. 2857-2868.

He, K. et al., "Deep Residual Learning for Image Recognition", Proceedings of the IEEE Conference on Computer Vision and Pattern Recognition (CVPR), Jun. 2016, pp. 770-778.

He, K. et al., "Masked Autoencoders are Scalable Vision Learners," Proceedings of the IEEE/CVF Conference on Computer Vision and Pattern Recognition (CVPR), (2022), pp. 16000-16009.

He, K. et al., "Momentum Contrast for Unsupervised Visual Representation Learning," Proceedings of the IEEE/CVF Conference on Computer Vision and Pattern Recognition, 2020, pp. 9729-9738.

Hu, H., et al, "Anatomy-Aware Self-Supervised Learning for Aligned Multi-Modal Medical Data," British Machine Vision Conference (BMVC), 2022, 14 pages.

Huynh, T., et al, "Boosting Contrastive Self-Supervised Learning with False Negative Cancellation," Proceedings of the IEEE/CVF Winter Conference on Applications of Computer Vision (WACV), 2022, pp. 986-996.

Irvin, J. et al. "CheXpert: A Large Chest Radiograph Dataset with Uncertainty Labels and Expert Comparison," Proceedings of the AAAI Conference on Artificial Intelligence, vol. 33, No. 01, 2019, pp. 590-597.

Jaeger, S. et al., "Two public chest X-ray datasets for computer-aided screening of pulmonary diseases," Quantitative Imaging in Medicine and Surgery, vol. 4, No. 6, 2014, pp. 475-477.

Jenni, S. et al., "Steering Self-Supervised Feature Learning Beyond Local Pixel Statistics," Proceedings of the IEEE/ CVF Conference on Computer Vision and Pattern Recognition, 2020, pp. 6408-6417.

Jiang, Y., et al, "Anatomical Invariance Modeling and Semantic Alignment for Self-supervised Learning in 3D Medical Image Analysis," Proceedings of the IEEE/CVF International Conference on Computer Vision (ICCV), 2023, pp. 15859-15869.

* cited by examiner

TABLE 1:

| INITIALIZATION | | CLASSIFICATION | | SEGMENTATION | | | |
|---|---|---|---|---|---|---|---|
| | | CHESTX-RAY14 | SHENZHEN CXR | SCR-HEART | SCR-CLAVICLE | SIIM-ACR | CHESTX-DET |
| SUPERVISED | RANDOM | 80.31±0.10 | 89.03±1.82 | 88.87±5.36 | 80.66±3.09 | 67.54±0.60 | 71.22±1.87 |
| | IMAGE NET-SUP | 81.70±0.15 | 95.62±0.63 | 93.58±1.03 | 86.92±2.05 | 67.93±1.45 | 73.07±0.69 |
| | CHESTX-RAY14-SUP | - | 96.32±0.65 | 93.59±1.22 | 87.0±1.66 | 68.92±0.98 | 73.13±0.72 |
| IMAGE-LEVEL | MOCO-V2 [18] | 80.36±0.26 | 91.56±1.58 | 92.45±0.92 | 82.89±3.86 | 67.89±0.14 | 70.83±1.30 |
| | BARLOW TWINS [83] | 80.45±0.29 | 94.47±0.20 | 91.87±1.88 | 85.19±4.79 | 69.36±0.83 | 71.8±1.18 |
| PATCH-LEVEL | VICREGL [6] | 80.88±0.20 | 91.67±2.82 | 92.48±1.47 | 80.0±4.03 | 67.86±1.08 | 73.13±0.72 |
| | DENSECL [71] | 80.91±0.18 | 93.29±0.94 | 92.99±1.35 | 87.04±0.63 | 68.49±0.76 | 70.98±2.68 |
| PIXEL-LEVEL | PCRL [86] | 80.56±0.08 | 93.32±1.41 | 93.50±1.01 | 84.10±3.73 | 68.01±1.28 | 71.45±0.59 |
| | DIRA [33] | 81.12±0.17 | 92.94±0.98 | 94.26±0.93 | 88.91±0.58 | 69.24±0.41 | 72.35±0.99 |
| | ADAM | 81.96±0.06 | 95.21±0.68 | 94.86±0.33 | 89.12±1.14 | 69.53±0.6 | 73.45±0.84 |

TABLE 2:

| | BT | DENSECL | DIRA | ADAM |
|---|---|---|---|---|
| T=10 | 50.54 | 55.68 | 58.13 | 58.49 (+0.36) |
| T=20 | 38.01 | 40.63 | 42.74 | 43.95 (+1.20) |
| T=30 | 26.36 | 26.81 | 27.52 | 29.54 (+2.03) |
| T=40 | 16.93 | 15.93 | 16.25 | 18.06 (+1.80) |
| T=50 | 9.31 | 7.71 | 9.30 | 9.63 (+0.30) |

ANATOMICAL LANDMARKS

EACH COLOR REPRESENTS AN ANATOMICAL LANDMARK

1001

1002

TABLE 3:

| METHOD | SCR-HEART (DICE%) | | SCR-CLAVICLE (DICE%) | |
|---|---|---|---|---|
| | 5-SHOT | 10-SHOT | 5-SHOT | 10-SHOT |
| BARLOWTWINS | 50.86 | 71.13 | 49.33 | 58.79 |
| DENSECL | 74.43 | 75.79 | 36.49 | 63.03 |
| DIRA | 64.47 | 76.10 | 34.36 | 66.81 |
| ADAM | 88.31 | 90.26 | 79.03 | 84.75 |

IMAGE 1                    IMAGE 1 (ROTATION ≈10°)

IMAGE 1                    IMAGE 2

IMAGE 1                    IMAGE 3

1301

```
Algorothm 1 : Purposive Pruner

Input : Anchor Gray Code Gc;
              Gray Code Level n;
              Memory Bank MB;
      Output: Pruned memory bank Mb_pruned
1  If n = 0 Then
2  |    MB_pruned = MB;
3  Else If 1 ≤ n ≤ 2 then
4  |    // Remove patches at the same location as anchor from memory bank
5  |    foreach (k_i,gc_i) ε MB do
6  |    |      If Hamming_Distance(gc,gci)=0Then
7  |    |      |   MB_pruned ⟵ (k_i, gc_i);
8  |    end
9  else
10 |    // remove patches at the same or adjacent locations to  anchor from memory bank
11 |    foreach (k_i, gc_i) ε mb do
12 |    |  if hamming_distance(gc,gci)> 1 then
13 |    |  |  Mb_pruned ⟵ (k_i, gc_i);
14 |    |  else if hamming_Distance (gc,gc_i)=1 then
15 |    |  |  // msb=most significant bit, second_msb=second most significant bit
16 |    |  |  // e.g.   in 100, msb is 1 and in 010 second_msb is 1
17 |    |  |  // differ_in_msb () checks if two codes differ only in their msb
18 |    |  |  // differ_in_second_msb()  checks if two codes differ only in their second_msb
19 |    |  |  if gc is adjacent to only blue line & differ_in_second_msb(gc,gc_i) then
20 |    |  |  |  MB_pruned ⟵ (k_i,gc_i)
21 |    |  |  else if gc is adjacent  to only yellow line& differ_in_msb(gc,gc_i)then
22 |    |  |  |  MB_pruned ⟵ (k_i,gc_i) ;
23 |    |  |  else if gc is not adjacent  to yellow and blue  line & (differ_in_MSB(gc,gc_i)‖differ_in_second_MSD(gc,gc_i)then
24 |    |  |  |  MB_pruned ⟵ (k_i,gc_i) ;
25 |    |  |  else
26 |    |  |  |  continue ;
27 |    |  end
28 |    end
29 end
```

SYSTEMS, METHODS, AND APPARATUSES FOR LEARNING FOUNDATION MODELS FROM ANATOMY IN MEDICAL IMAGING FOR USE WITH MEDICAL IMAGE CLASSIFICATION AND SEGMENTATION

CLAIM OF PRIORITY

This application claims the benefit of U.S. Provisional Patent Application No. 63/430,219, filed Dec. 5, 2022, entitled "SYSTEMS, METHODS, AND APPARATUSES FOR LEARNING FOUNDATION MODELS FROM ANATOMY IN MEDICAL IMAGING FOR USE WITH MEDICAL IMAGE CLASSIFICATION", the disclosure of which is incorporated by reference herein in its entirety.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

TECHNICAL FIELD

Embodiments of the invention relate generally to the field of medical imaging and analysis using convolutional neural networks and transformers for the classification and annotation of medical images, and more particularly, to systems, methods, and apparatuses for learning foundation models from anatomy in medical imaging for use with medical image classification and/or image segmentation in the context of medical image analysis.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Unfortunately, existing Self-Supervised Learning (SSL) methods lack such capabilities to appreciate the foundation of medical imaging-human anatomy.

What is needed is an improved technique for leveraging the structure and patterns of human anatomy as already present within medical imaging for the generation of base foundational models.

The present state of the art may therefore benefit from the systems, methods, and apparatuses for learning foundation models from anatomy in medical imaging for use with medical image classification and/or image segmentation in the context of medical image analysis, as described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 3A depicts Table 1 (element 301) which shows comparisons with SOTA self-supervised and fully-supervised pretrained models on classification and segmentation.

FIG. 3B depicts Table 2 (element 302) which shows weakly-supervised disease localization under different IoU thresholds (T).

FIG. 10C depicts Table 3 (element 1003) which shows a few-shot transfer on two medical segmentation tasks.

FIG. 13 depicts a purposive pruner identified as Algorithm 1, which presents the details of the purposive pruner (PP) component.

DETAILED DESCRIPTION

Described herein are systems, methods, and apparatuses for learning foundation models from anatomy in medical imaging for use with medical image classification and/or image segmentation in the context of medical image analysis.

In the field of medical image analysis, the use of foundation models represents a phase change in deep learning. To date, natural language processing (NLP) has been the field most profoundly affected by foundation models pretrained via self-supervised learning (SSL). However, their success in medical imaging has been hardly observed, owing to the incapability of existing SSL methods to appreciate the foundation of medical imaging-human anatomy. Described herein are novel methodologies directed towards learning foundation models from anatomy in medical imaging, through which a novel training strategy is devised, with the aim to understand anatomy via hierarchical self-supervised contrastive learning. Extensive experiments show that the SSL pretrained model known as "Adam" as set forth herein not only generalizes to a myriad of tasks but also preserves two intrinsic properties of anatomical structures, (i) locality and (ii) compositionality, in its embedding space, which is useful for anatomy understanding.

INTRODUCTION

Foundation models such as Generative Pretrained Transformer-3 (GPT-3), DALL-E, and Imagen, when pretrained via self-supervised learning (SSL), have recently taken natural language processing (NLP) by storm and transformed vision-language modeling forever, generating headlines in public media. However, their success in medical imaging has been hardly observed, even in light of annotation dearth, a significant challenge facing deep learning for medical image analysis, though numerous self-supervised learning methods have been developed.

These differences are due to the fact that SSL methods developed for NLP, such as masking language modeling, have proven to be powerful in capturing the underlying structures (foundation) of the English language, from which a number of intrinsic properties of the language emerge naturally, while the existing SSL methods lack such capabilities to appreciate the foundation of medical imaging-human anatomy (refer to FIG. 8 which is discussed in greater detail below). What is needed is a way to learn foundation models from human anatomy in medical imaging.

Figure 1:
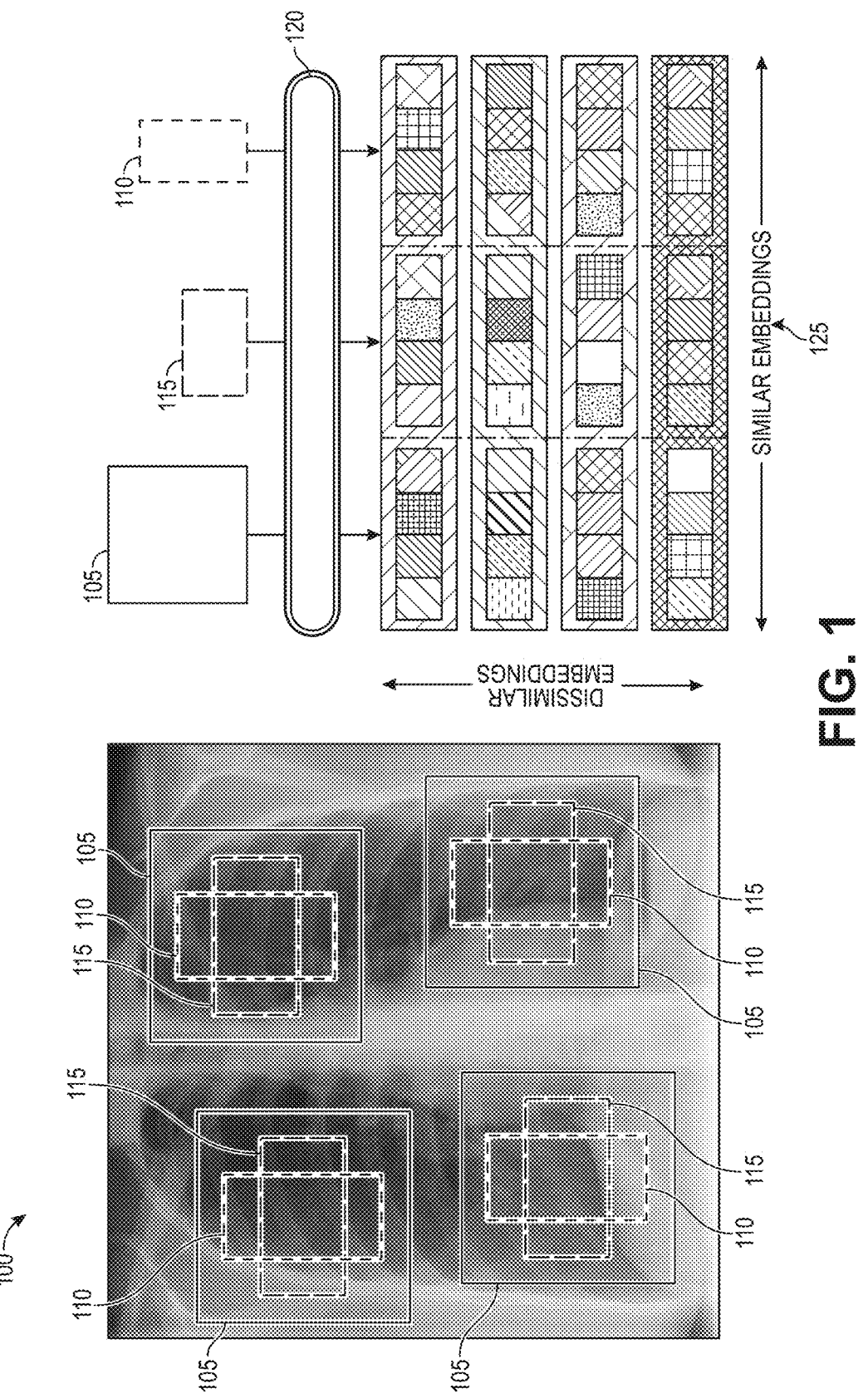
FIG. 1 provides a graphical representation of the hypothesis that the incompetence of foundation models in medical imaging is because the existing SSL lack capabilities of "understanding" the foundation of medical imaging and specifically human anatomy.

FIG. 1 provides a graphical representation 100 of a hypothesis that the incompetence of foundation models in medical imaging is because the existing SSL methods lack capabilities of "understanding" the foundation of medical imaging and specifically human anatomy.

As a first step in understanding human anatomy, the described methodology assumes that such a foundation model can transform each pixel in an image (e.g., a chest X-ray) into semantics-rich numerical vectors, called embeddings, where different anatomical structures are associated with different embeddings, and the same anatomical structures have (nearly) identical embeddings at all resolutions and scales across patients.

As depicted in FIG. 1, for the same pixel (location), regardless of anatomical structures indicated by boxes 105, 110 and 115, a model 120 according to embodiments can produce (nearly) identical embeddings for them. Furthermore, the model can generate similar embeddings 125 for similar anatomical structures across patients. For different pixels (locations) even within the same image, the model can distinguish them via their embeddings.

Given the hierarchical nature of human anatomy (refer again to FIG. 8 below), this is made possible using Gray-coded image division, which leads to a novel hierarchical training strategy to learn anatomy from medical imaging (refer to FIGS. 2A, 2B, and 2C below), resulting in embeddings with such desired properties (refer to FIGS. 4 and 5 below).

As is well understood by the scientific community, human anatomy exhibits natural hierarchies. For example, the lung is divided into the right lung and the left lung (refer again to FIG. 8 below). Each lung is then further divided into lobes. The left lung has two and the right lung has three. The pulmonary arteries, veins, and airways form hierarchical trees. Consequently, anatomical structures have two important properties: locality, where each anatomical structure is distinct from the others, and compositionality, where each anatomical structure is a part of a larger whole.

These anatomical hierarchies are exploited for training foundation models using Gray-coded image division, where an image is divided recursively, and each division is coded with a Gray code.

Figure 2A:
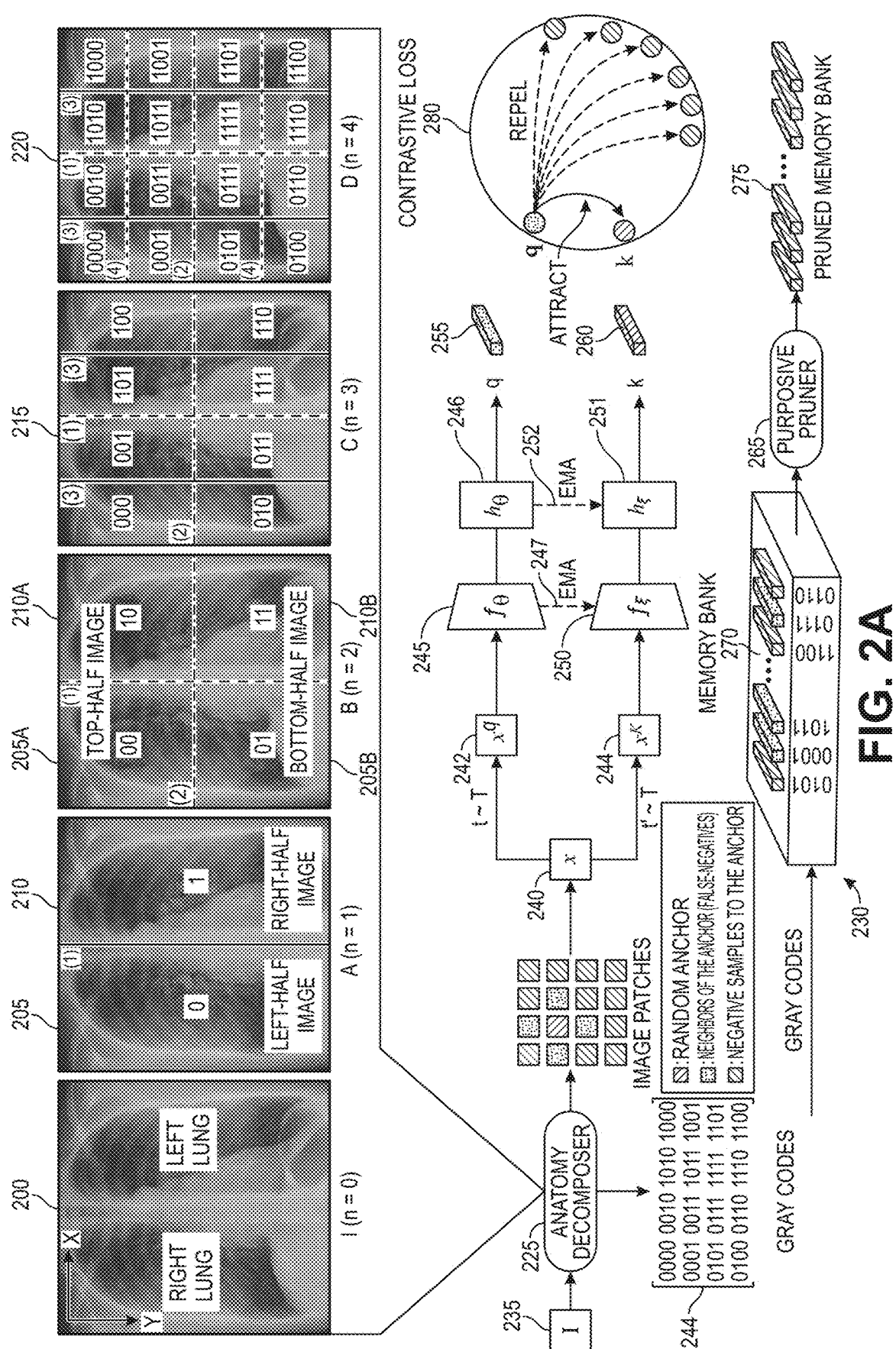
FIGS. 2A, 2B, and 2C provide a graphical representation of the overall pipeline of Adam, in accordance with described embodiments.
Figure 2B:
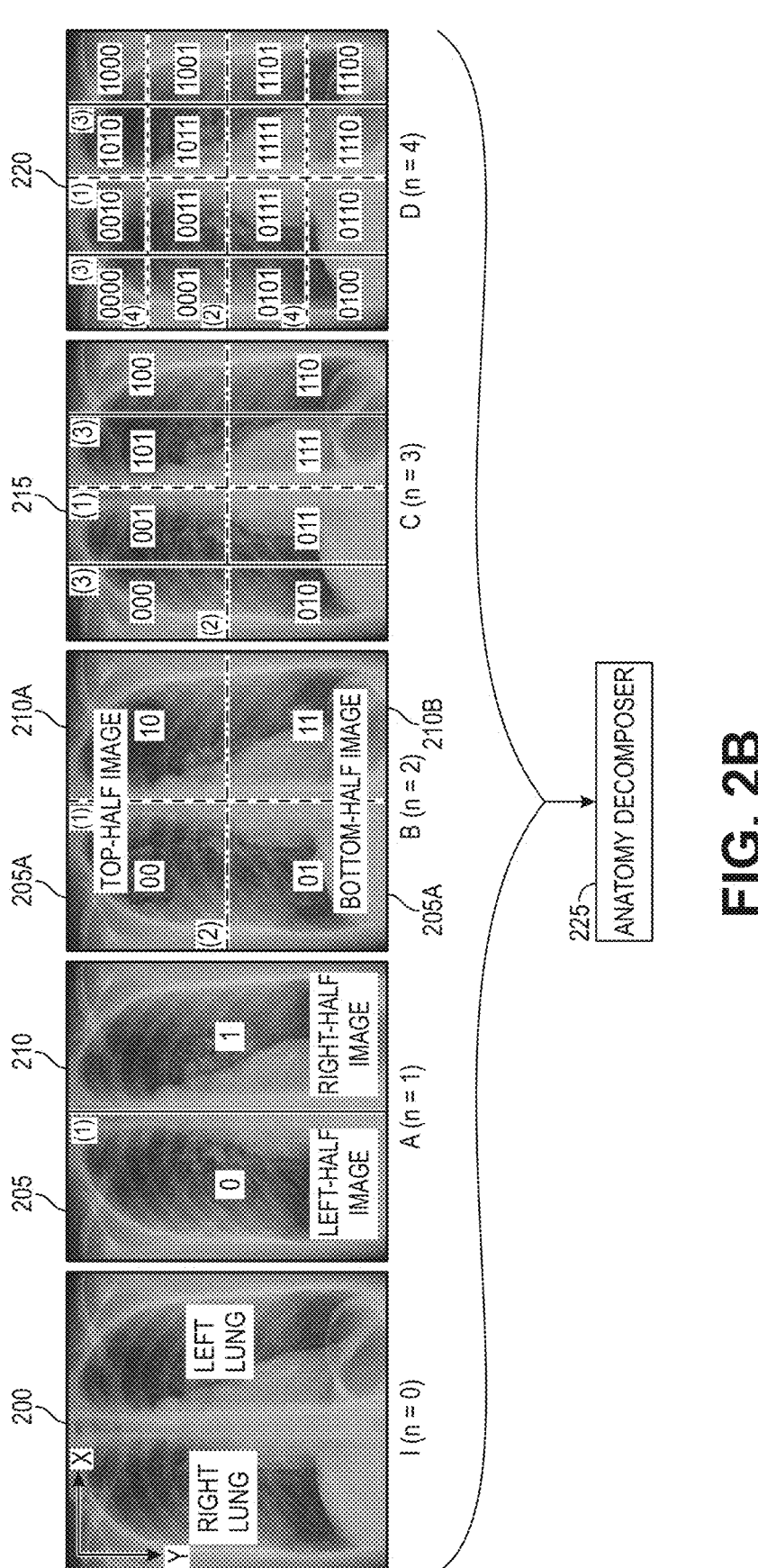
Figure 2C:
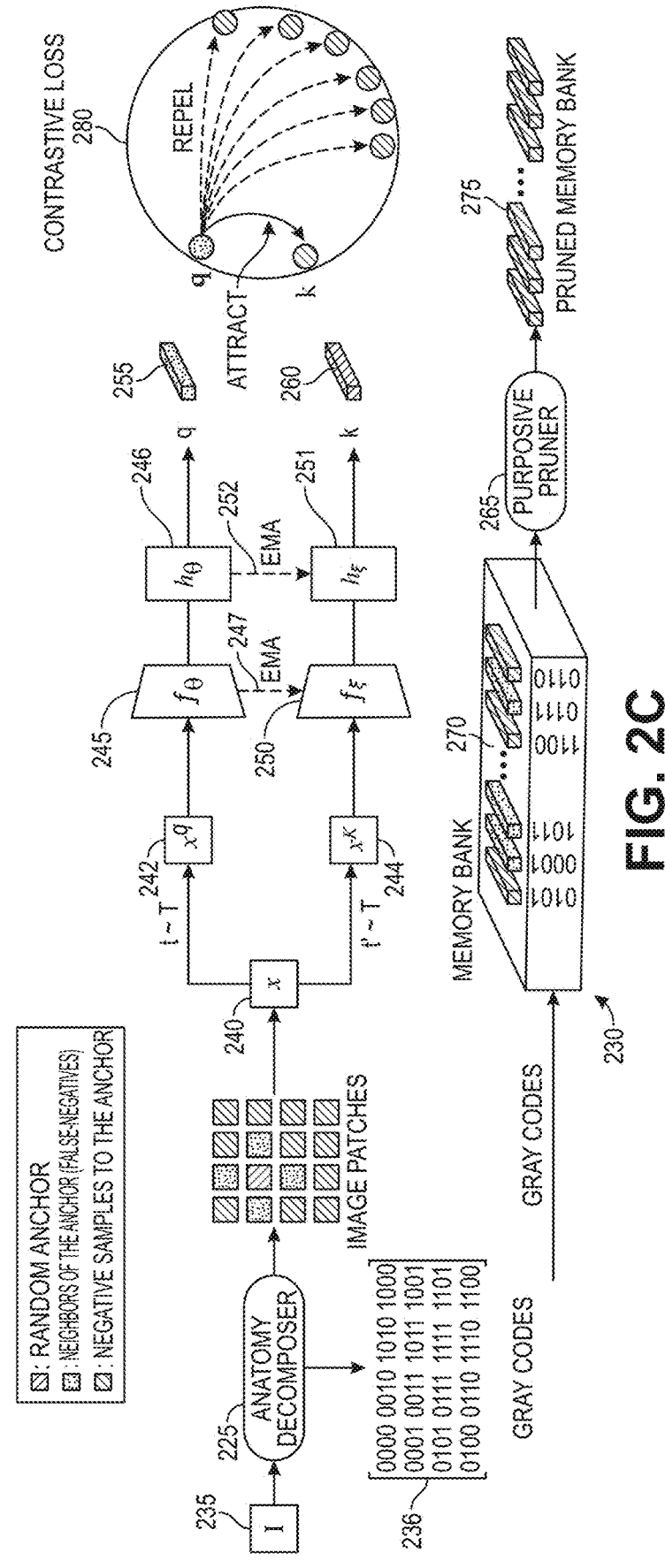

As an example, with reference to FIGS. 2A, 2B and 2C, a chest X-ray 200 may be decomposed into two distinct parts: a left-half 205 and right-half 210, each of which can be further subdivided into two more halves 205A, 205B, 210A and 210B, generating more (sub-) anatomical structures, and so on as depicted 215 and 220. This image division may not necessarily correspond to the anatomy division across patients, and experiments demonstrate that such correspondence across patients is not necessary to learn consistent anatomical embedding across chest X-rays because the hierarchical relationships are utilized as soft supervision signals.

In fact, such anatomical diversity inherited from the image division enhances model robustness. This new concept enables a novel training strategy, which is hierarchical, autodidactic, coarse, and data-efficient, resulting in a pretrained model, which is versatile, and leading to anatomical embedding, which is dense and semantics-meaningful.

The training strategy is hierarchical because it decomposes and perceives the anatomy progressively in a coarse-to-fine manner (refer to the discussion below of Anatomy decomposer), autodidactic because it learns from anatomy through self-supervision, thereby requiring no anatomy labeling (refer to the discussion below of Training Adam), coarse because it eliminates the need for pixel-level pretraining yet generates dense anatomical embedding (refer to the discussion below of Purposive pruner), and data efficient because it exploits the consistency of anatomy across patients under each particular imaging protocol and waives the need for large-scale data for pretraining.

The pretrained model is versatile because it is strong in generality and adaptability, resulting in performance boosts (refer to the discussion below of Adam provides generalizable representations), accurate disease localization (refer to the discussion below of Adam enhances weakly-supervised localization), and label efficiency (refer to the discussion below of Adam is more label efficient) in a myriad of tasks.

The generated anatomical embedding is dense and semantics-rich because it possesses two intrinsic properties of anatomical structures: locality (refer to FIG. 4 below) and compositionality (refer to FIG. 5 below) in the embedding space, which are useful for anatomy understanding.

The pretrained foundation model is referred to herein as "Adam" which stands for "Autodidactic Dense Anatomical Models," because it learns autodidactically and yields dense anatomical embedding, nicknamed "Eve" which stands for "Embedding VEctors" for semantic richness. A project site is referred to as "Eden" which stands for "Environment for Dense Embeddings and Networks."

The new Gray-coded image division approach described herein decomposes the anatomy within medical images into a hierarchy of parts and encodes their relationships. The novel self-supervised learning strategy described herein progressively learns anatomy in a coarse-to-fine manner via hierarchical contrastive learning. A comprehensive and insightful set of experiments demonstrate not only Adam's generalizability but also the semantic richness of its learned embedding space in preserving the locality and compositionality of anatomical structures underneath medical images.

Related Work—Foundation Models:

FIGS. 2A, 2B, and 2C provide a graphical representation of the overall pipeline of Adam, in accordance with described embodiments.

Adam gradually decomposes and perceives the anatomy in a coarse-to-fine manner as depicted at 200-220. An Anatomy Decomposer (AD) 225 decomposes the anatomy within medical images into a hierarchy of parts with granularity level $n \in \{0, 1, \ldots\}$ at each training stage and encodes their relationships using n-bit Gray codes 230. As such, anatomical structures of finer-grained granularity are incrementally presented to the model as the input. An image I 235 is input to AD 225 to get a random anchor x 240 and its corresponding Gray code. x is then augmented to generate two views (i.e., positive samples t~T and t'~T) and pass them to two twin networks 245 and 250 to get their embedding vectors q 255 and k 260. To avoid semantic collision in training objective, a Purposive Pruner component 265 removes the false negative samples (i.e., similar anatomical structures across images) to anchor x from a memory bank 270 and stored in a pruned memory bank 275. The positive samples' features in q 255 and k 260 and the pruned memory bank 275 are then used for computing contrastive loss. FIGS. 2A, 2B and 2C show a snapshot of pretraining process at n=4.

Foundation models are deep models that are trained on broad data (generally using SSL) and can be adapted (through transfer learning) to a wide range of downstream tasks. While foundation models have emerged most strongly in NLP, they are also becoming more prevalent in computer vision. However, foundation models for medical imaging are nascent compared to their NLP or vision counterparts. Known techniques include SSL pre-training on 100M medical images, whereas other techniques utilized a two-stage pretraining on large-scale natural images followed by pretraining on in-domain medical data. Despite their promising results, such techniques rely on large-scale labeled data and/or internal datasets and provide image-level embedding, which limits their availability and scalability.

By contrast, Adam is trained via SSL and generates dense anatomical embedding. Self-supervised learning methods aim to learn generalizable representations without human supervision. Early works focused on handcrafted pretext tasks based on the inherent structure of the data. Recent state-of-the-art (SOTA) methods mainly relied on instance discrimination.

These methods consider each image as a separate class and maximize the agreement between representations of augmented views of the same image, aiming to learn augmentation-invariant representation, and can be divided into contrastive and non-contrastive. Contrastive methods use negative pairs to distinguish different samples from one another, whereas non-contrastive methods use regularization or architectural/optimization tricks to prevent collapsing solutions. Instance discrimination methods have also been explored to pretrain vision transformers.

Such instance-based approaches are focused on learning an embedding for a whole image and thus cannot meet the need for anatomical embedding. As a result, another line of research focused on dense SSL, seeking to learn local image representations and can be categorized into generative and contrastive. Generative approaches mask/corrupt random parts of the input image and reconstruct the missing/corrupted parts at the pixel-level.

While recent works have demonstrated promising results by employing large-scale transformer models, generative approaches fall short in modeling relations among different images, which may weaken the features' discriminative ability.

Contrastive approaches on the other hand, extend image-level contrastive learning for dense prediction tasks by establishing dense correspondences across different image views and enforcing consistency between pixels at similar locations across views, similar pixels at feature-map level or similar image regions.

However, given the significant disparity between photographic and medical images, both instance discrimination and dense SSL methods appear to be suboptimal in extracting a distinct set of representations from medical images, owing to ignoring the unique properties of medical images. Adam addresses this limitation by exploiting a learning strategy based on anatomy underneath medical images, resulting in more robust and discriminative representations for medical tasks.

Self-supervised learning in medical imaging has been explored in both image-level and pixel-level forms. While early research mostly concentrated on pixel-level reconstruction pretext tasks, recent innovations have explored image-level contrastive learning. However, these methods yield image-wise representations that have been shown to be useful for only classification tasks. Most recent works demonstrated SOTA performance by integrating contrastive learning with dense prediction tasks. Other techniques have extended image-level contrastive learning by adding a local contrastive loss for 3D medical segmentation tasks.

However, such a technique relies on aligned images for establishing dense correspondences, limiting its applicability to many applications. Additionally, multiple works combined contrastive learning with pixel-level reconstruction tasks.

Conversely, the newly developed techniques as set forth herein distinguish themselves from prior lines of approach by demonstrating two advances: (1) capturing the hierarchical relationships among anatomical structures, and (2) learning semantics-rich dense anatomical embeddings via contrastive learning with no constraints on the pretraining data.

Method:

Adam develops foundation models via learning anatomy underneath medical images, resulting in generic representations. The main intuition behind Adam is the principle of totality in Gestalt psychology: Specifically, the principle that when humans observe an image, they commonly first recognize the prominent object in the image (e.g., a human body) and then gradually recognize the detail parts based on the context (i.e., prior knowledge) about that object (e.g., the top of a body is the head).

Inspired by this principle, Adam decomposes and perceives the anatomy progressively in a coarse-to-fine manner with the goal of not only learning anatomy's (local and global) contextual information but also their relative, hierarchical relationship. The Adam framework as depicted in FIGS. 2A, 2B, and 2C is a self-supervised contrastive learning framework comprised of two components: (1) an anatomy decomposer (AD), which aims to guide the model to conserve hierarchical relationships of anatomical structures within medical images; and (2) a purposive pruner (PP), which aims to compel the model to capture more distinct representations for different anatomical structures at various granularity levels.

Anatomy Decomposer:

The Anatomy Decomposer (AD) 225 decomposes a given anatomy into a set of anatomical structures and then encodes their relative, hierarchical relationship. The AD component 225 takes two inputs: (1) an input image I 235 and (2) an anatomy granularity level n, e.g., n=4 as depicted at 220, and then generates two outputs: (1) a random anatomical structure instance x 240 and (2) an identifier code gc 230 via leveraging a Gray-coded image division as explained below:

Gray-coded image division. Gray code is a simple, low computational complexity yet scalable binary encoding system for medical images inspired by the classic Gray Code, to capture relative, hierarchical relationships of anatomical structures in medical images and encode anatomical structures across medical images. Embodiments generate unique binary encoding for anatomical structures within medical images in a recursive manner.

As shown in FIGS. 2A, 2B, and 2C, image I 200 is split in half vertically at 205 and 210. The left-half 205 and right-half 210 parts are coded with values 0 and 1, respectively. Then, to create n-bit codes from (n−1)-bit codes, if n−1 is odd (i.e. 1, 3, . . . ), then every image part is split from the n−1 level horizontally, otherwise, where n−1 is even, every image part is split from the n−1 level vertically; after that, with each split (horizontal or vertical), an alternating pattern (0 and 1) or (1 and 0) is added to the end (right-most) of the code value of the (n1)-bit code of the respective part. This process results in $2^n$ image patches and their associated n-bit Gray codes $$\{(x_i, gc_i)\}_{i=1}^{2^n}.$$

The number of digits in the Gray code is referred to as the Gray code level. For example, A, B, C, and D in FIGS. 2A, 2B, and 2C have levels of 1, 2, 3, and 4, respectively, dividing image I into 1×2, 2×2, 2×4, and 4×4 anatomical structures; each anatomical structure is associated with a unique Gray code, and between any two neighboring anatomical structures, only one bit changes in their Gray codes. Note that extending the Gray code to 3D images is simple and can be done in a similar manner. More details are provided below in reference to FIGS. 8 through 13.

Given the anatomical structure set and their corresponding Gray codes $$\{(x_i, gc_i)\}_{i=1}^{2^n}$$

from Gray-coded image division, the AD component 225 randomly samples an anatomical instance x 240 with code gc 230, which is further used as the input for training the model. As such, during the pretraining, anatomical structures at various granularities are generated and used for training the model.

Purposive Pruner:

Purposive Pruner (PP) 265 aims to prune the memory bank 270 by removing false negative samples. Given an anchor anatomical structure x 240 sampled from image 1235, false negatives are defined as the anatomical structures from different images that are largely similar to the x; these similar anatomical structures can be placed at the same or slightly shifted spatial locations across images (due to inter-subject variations caused by patient position, camera angle, etc.). In fact, similar anatomical structures across images share semantics and should be close in the embedding space; however, they are regarded as negative samples in the standard contrastive learning paradigm and are undesirably repelled, resulting in a sub-optimal embedding space where the instances of the same anatomical structure (from different patients) are mapped to different points. The PP component 265 tackles this issue by removing the samples at the same or adjacent spatial locations (for finer data granularity levels) to the anchor x from the negative set in the memory bank. To do so, Hamming distances (HD) are computed between x's Gray code and the ones of the samples in the memory bank and the samples with HD "0 (i.e. samples at the same location as x) or 1 (i.e. samples at the adjacent locations to x) are removed from memory bank 270 (refer to the details as set forth by Algorithm 1 depicted at FIG. 13 below), resulting in pruned memory bank 275. Hence, PP 265 provides a more accurate supervision signal for contrastive learning of anatomical structures, resulting in robust and discriminative representations.

Training Adam:

Embodiments develop foundation models by learning from anatomy via hierarchical self-supervised contrastive learning. While the approach is generic, it is described herein in the context of Momentum Contrast. The framework consists of two twin backbone networks $f_\theta$ 245 and $f_\xi$ 250, and projection heads $h_\theta$ 246 and $h_\xi$ 251. Each of $f_\theta$ 245 and $h_\theta$ 246 are updated by backpropagation, while each of $f_\xi$ 250 and $h_\xi$ 251 are updated by using an exponential moving average (EMA) 247 and 252, respectively of the parameters in $f_\theta$ 245 and $h_\theta$ 246, respectively.

Moreover, memory bank 270 stores the embeddings and Gray codes of negative samples $$MB = \{(k_i, gc_i)\}_{i=1}^{K},$$

where K is the memory bank size. For learning anatomy in a coarse-to-fine manner, the process progressively increases the anatomical structures granularity. As such, at each training stage, anatomical structures with the granularity level are presented to the model. An input image I 235 and data granularity level n $n \in \{0, 1, \ldots\}$ are passed to AD component 235 to get a random anatomical structure and its corresponding Gray code (x 240, gc). An augmentation function T(.) is then applied on x to generate two different views $x_q$ 242 and $x_k$ 244. The two views are then processed by $f_\theta$ 245 and $f_\xi$ 250 to generate latent features $y_q = f_\theta(T(x_q))$ and $y_k = f_\xi(T(x_k))$. The terms $y_q$ and $y_k$ are then encoded by $h_\theta$ 246 and $h_\xi$ 251 to generate projections $z_q = h_\theta(y_q)$ and $z_k = h_\xi(y_k)$.

Then, gc 230 and MB 270 is passed to PP component 265 to eliminate the false negative samples for anchor x, resulting in the pruned memory bank 275 $MB_{pruned}$, which is used to compute the InfoNCE loss function, represented by equation 1, as follows:

$$\mathcal{L}_{Adam} = -\log \frac{\exp(z_q \cdot z_k / \tau)}{\exp(z_q \cdot z_k / \tau) + \sum_{i=1}^{K'} \exp(z_q \cdot k_i / \tau)}$$

where $\tau$ is a temperature hyperparameter, K' is the size of $MB_{pruned}$, and $k_i \in MB_{pruned}$. AD component 225 enables the model to first learn anatomy at a coarser-grained level, and then use this acquired knowledge as effective contextual clues for learning more fine-grained anatomical structures, resulting in a rich embedding space that preserves anatomical structures compositionality. Moreover, PP module 265 enables the model to learn a semantically-structured embedding space that maintains anatomical structures locality by removing semantic collision from the model's learning objective.

Implementation Details—Pretraining Settings:

Embodiments use the unlabeled images from the training set of ChestX-ray14 dataset for pretraining. Methodologies follow Momentum Contrast version 2 (MoCo-v2) standards in pretraining settings and hyperparameters. The methodology adopts a standard ResNet-50 (a convolutional neural network that is 50 layers deep) as the backbone and uses Gray codes of up to 4-bits. It should be noted that Gray codes add a negligible computational complexity to the pretraining process. The model is optimized using Stochastic Gradient Descent (SGD) with an initial learning rate of 0.03, weight decay 1e-4, SGD momentum 0.9, cosine decaying scheduler, and a batch size 256 distributed across 4 Nvidia V100 GPUs with a memory of 32 GB per-card. The input anatomical structures are resized to 224×224; the image augmentation function T includes random cropping, color jittering, Gaussian blurring, and random rotation.

Transfer Learning Settings—Downstream Tasks:

The transfer capability of Adam's representations was thoroughly evaluated in a wide range of 7 challenging downstream tasks on six publicly available datasets, including ChestX-ray14, NIH Shenzhen CXR, SIIM-ACR, SCR-Heart, SCRClavicle, and ChestX-Det. These tasks are challenging by nature as they have imbalanced classes, limited data, and small scanning areas for the object of interest.

The experimental setup ensure that Adam's representations are assessed under varying challenging tasks (i.e., classification, segmentation, and localization), object definitions (i.e., lesion and anatomical structures), and object granularities (i.e., coarse-grained and fine-grained). The official data split of these datasets is used when available; otherwise, the data is randomly divided into 80%/20% for training and testing, respectively.

Baselines: Adam is compared with SOTA image, patch, and pixel-level SSL methods with diverse objectives, including MoCo-v2, Barlow Twins, Dense Contrastive Learning (DenseCL), VICRegL, Preservational Contrastive Representation Learning (PCRL), and DiRA, among which PCRL and DiRA represent SOTA methods designed for medical tasks. For all baselines, publicly available source code is used to train on the ChestX-ray14 dataset. Moreover, Adam, which is pre-trained solely on unlabeled images, is compared with two competitive fully-supervised baselines—including supervised pre-trained models on ImageNet (the most common pre-training) and ChestX-ray14 (the upper-bound in-domain pre-training).

Fine-tuning: Adam's pre-trained backbone is transferred to the classification tasks by appending a task-specific classification head. For the segmentation tasks, a U-Net network is employed with a ResNet-50 encoder, where the encoder is initialized with the pre-trained backbone. Following the standard protocol, the generalization of Adam's representations is evaluated by fine-tuning all the parameters of downstream models. The performance of classification by the AUC (area under the ROC curve) is measured, and segmentation by mean Dice coefficient and IoU (Intersection over Union) metrics. The goal is to identify the best hyperparameters for each downstream task. Each method is run ten times on each task and the average, standard deviation, and statistical analysis is reported based on an independent two-sample t-test.

Results:

This section presents the cornerstones of the results, with the goal of demonstrating the learned representation of Adam is (a) versatile, and (b) semantics-rich. To do so, Adam's generality and adaptability is first demonstrated in a myriad of tasks via conducting a set of extensive experiments in a triplet of aspects: (i) transfer learning performance as detailed below at the section entitled: "Adam provides generalizable representations," (ii) weakly supervised localization as detailed below at the section entitled: "Adam enhances weakly-supervised localization," and (iii) label efficiency as detailed below at the section entitled: "Adam is more label efficient." Then, to demonstrate the unique property of Adam's in anatomy understanding, its embedding space is dissected from a three-pronged perspective: (i) conserving the locality of anatomical structures as detailed below at the section entitled: "Adam preserves anatomical structures locality," (ii) keeping the compositionality of anatomical structures as detailed below at the section entitled: "Adam preserves anatomical structures compositionality," and (iii) finding dense visual correspondence across different views of an image and also different images as detailed below at the section entitled: "Adam shows expertise without being trained."

FIG. 3A depicts Table 1 (element 301) which shows comparisons with SOTA self-supervised and fully-supervised pretrained models on classification and segmentation. The data show that Adam provides superior transfer performance compared with SSL and fully-supervised baselines in all and five downstream tasks, respectively.

FIG. 3B depicts Table 2 (element 302) which shows weakly-supervised disease localization under different IoU thresholds (T). Notably, Adam provides stronger representations for pathology localization with just image-level annotations. The green numbers show the improvements of Adam compared with the second best method for each T. BT indicates Barlow Twins.

Figure 3C:
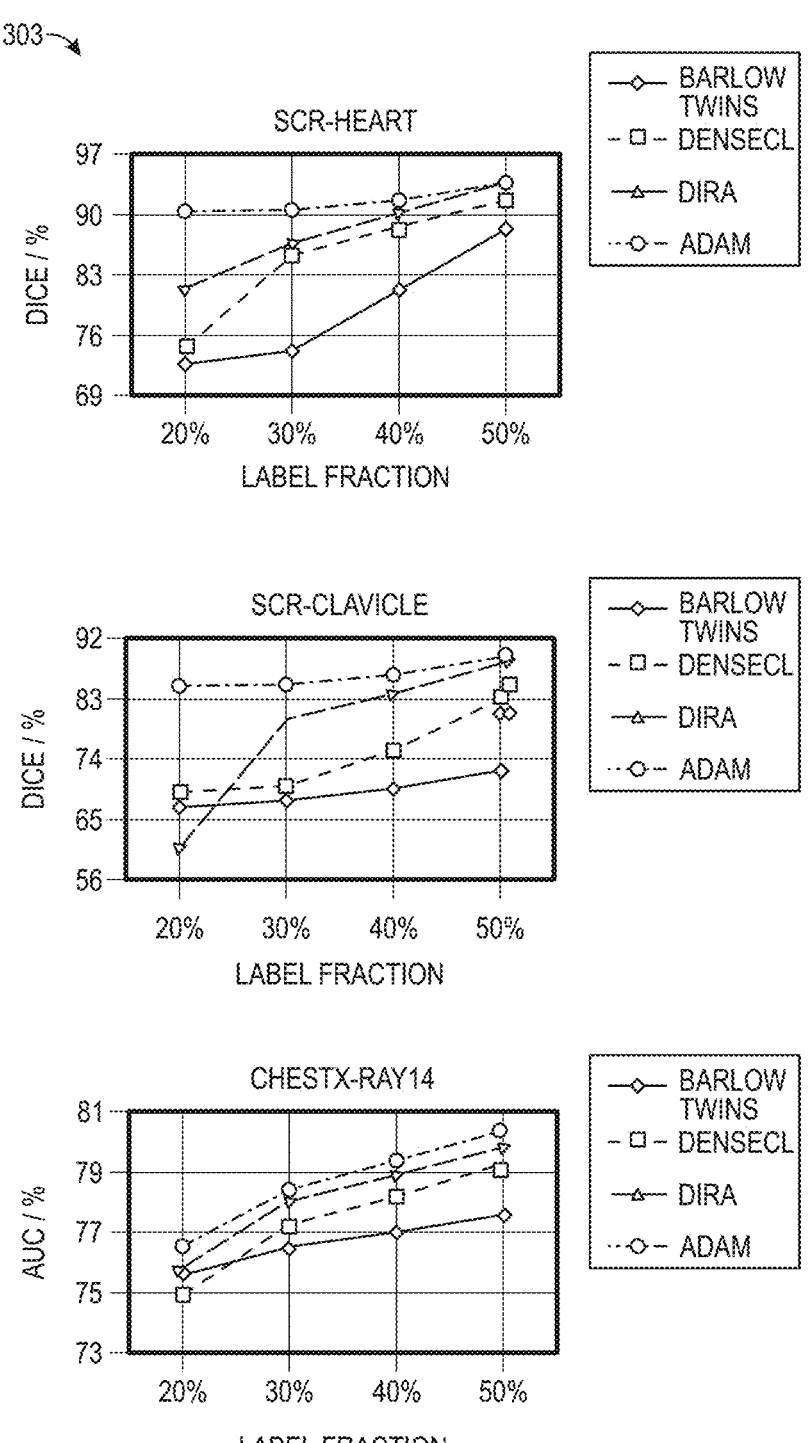
FIG. 3C depicts transfer learning under limited labeled data.

FIG. 3C depicts at 303 transfer learning under limited labeled data. Notably, Adam provides more robust representations for downstream tasks with limited labeled data, yielding significant performance gains.

Adam Provides Generalizable Representations:

Setups: The generality of Adam's representations through transfer learning is assessed with regard to a broad range of popular downstream tasks, including classification (ChestX- Ray14 and NIH Shenzhen CXR) and segmentation (SIIM-ACR, SCR-Heart, SCR-Clavicle, and ChestX-Det). Adam is compared with six SOTA SSL methods with diverse objectives, as well as two fully-supervised models pretrained on ImageNet and ChestX-ray14 datasets. Adam and all baselines benefit from the same backbone encoder (i.e., ResNet-50) and are fully fine-tuned on the downstream tasks. The results of training downstream models from random initialization (scratch) as the performance lower-bound is provided hereinbelow.

Results: As seen in Table 1 as set forth by FIG. 3A, Adam consistently outperforms all SSL counterparts in all downstream tasks. In particular, Adam demonstrates superiority over DiRA, the SOTA SSL approach for medical imaging. It's noteworthy that Adam accomplishes these results with a significantly less complex model than DiRA (23M vs. 34M parameters). Furthermore, compared with both supervised baselines, Adam yields superior performance in ChestX-Ray14, SIIM-ACR, SCR-Heart, SCR-Clavicle, and ChestX-Det, and on-par performance in NIH Shenzhen CXR. The consistent gain over baseline methods indicates the capability of Adam in learning generalizable representations that can be adapted for a wide range of applications.

Adam Enhances Weakly-Supervised Localization:

Setups: The efficacy of Adam's representations for weakly supervised localization downstream task is further assessed. To do so, the ChestX-ray14 dataset is used (additional details are provided below with reference to FIGS. 8 through 13). The images with bounding box annotations are only used during the testing phase to evaluate the localization accuracy. For training, the downstream model is initialized with Adam's pretrained weights and fine-tune it using only image-level disease labels. Then heatmaps are calculated using GradCAM to approximate the spatial location of a particular disease. A specialized is used to generate bounding boxes around the isolated regions. The localization accuracy is evaluated by computing the IoU between the generated and ground truth bounding boxes for the test images. A localization result is considered correct if the bounding box prediction overlaps with the ground truth box with IoU≥T, where T is a threshold. Adam is compared with the best performing SSL methods from each baseline group (i.e., instance-level, patch-level, and pixel-level) based on Table 1 as set forth by FIG. 3A.

Results: As seen in Table 2 as set forth by FIG. 3B, Adam outperforms the other SSL approaches at all IoU threshold values. These outstanding results can be attributed to the coarse-to-fine representation learning strategy, which results in richer visual information at different scales, providing a stronger prior for medical localization tasks. Qualitative results are discussed below with reference to FIGS. 8 through 13.

Adam is More Label Efficient:

Setups: Adam's representations' robustness in limited data settings is investigated to demonstrate the potential of the pre-trained model as a proper initialization and optimization method for deep models in the absence of large-scale annotated data. To accomplish this, Adam is fine-tuned using various fractions (i.e., 20% to 50%) of labeled training data from three datasets. Adam is compared to the best SSL methods in each baseline group.

Results: As seen at 303 in FIG. 3C, Adam achieves significant improvements over baselines in all label fractions. Moreover, Adam offers larger gains when fine-tuning with fewer labeled data, particularly in the segmentation tasks. For example, using 20% of labeled data from SCR-Heart dataset, Adam provides superior performance by 7%-16% compared with the other baselines. These results show that Adam learns more generic representations that can be fine-tuned into more accurate models even with limited supervision, thereby reducing annotation costs.

Figure 4:
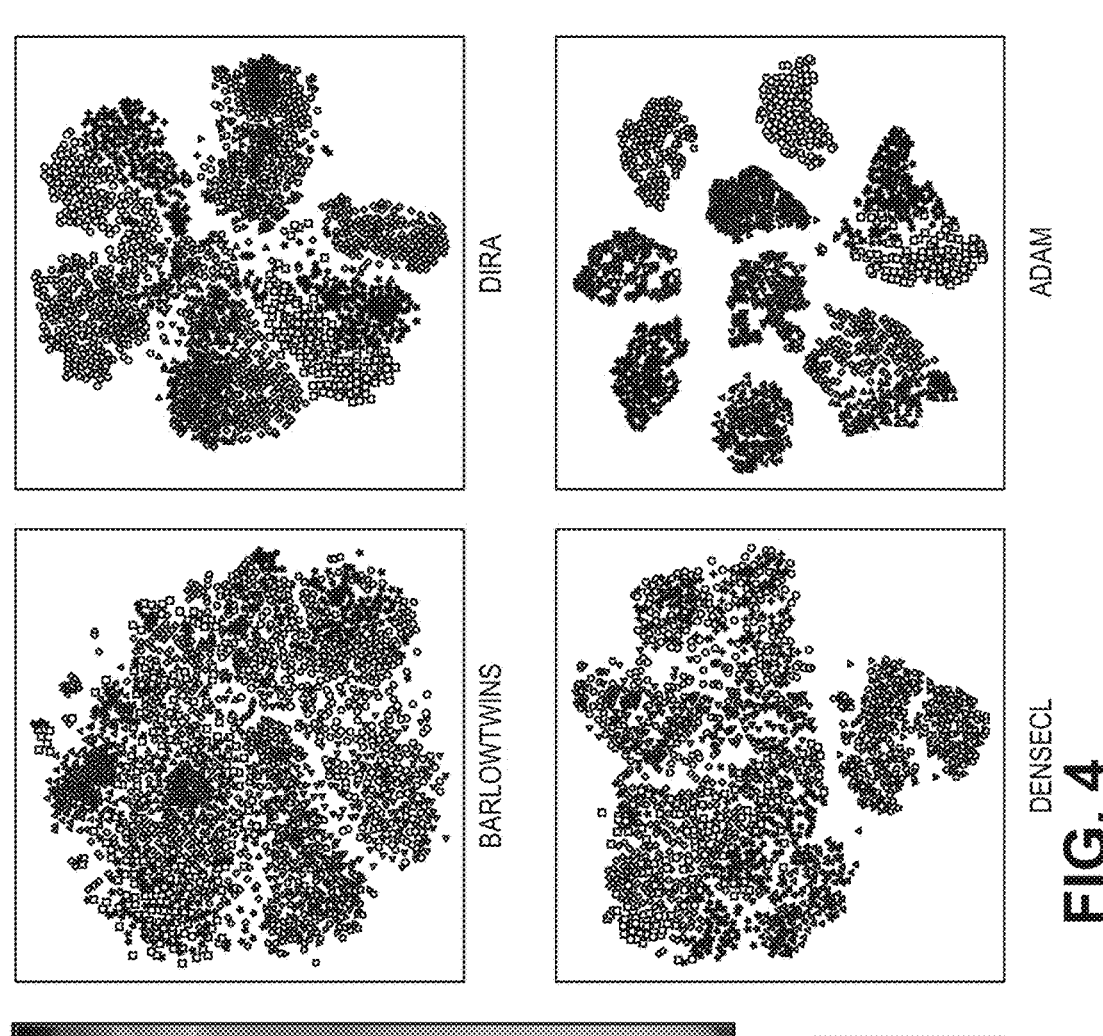
FIG. 4 depicts t-SNE visualization of anatomical landmarks.
Figure 4:
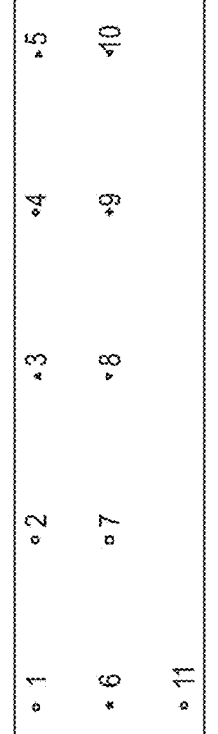

FIG. 4 depicts at 401 t-distributed Stochastic Neighbor Embedding (t-SNE) visualization of anatomical landmarks. Data points with the same color are instances of the same landmark extracted across images. Adam provides discriminative features for different landmarks, realizing anatomical structures locality.

Adam Preserves Anatomical Structures Locality:

Setups: Adam's capability in discriminating different anatomical structures is investigated to determine if the learned embedding space preserves the locality of anatomical structures. To do so, a dataset of 1,000 images (from ChestX-ray14 dataset) is created with 11 distinct anatomical landmarks manually annotated by human experts in each image as is depicted by FIG. 4. Patches of size 224×224 are extracted around each landmark's location across images and their latent features computed using Adam's pretrained model (with no fine-tuning). In particular, features are extracted from the last layer of the ResNet-50 backbone and passed to a global average pooling layer to obtain a feature vector for each of the landmark instances. The features are visualized by projecting them to a two-dimensional space using t-SNE.

Results: As seen in FIG. 4, the baselines are unable to provide distinguishable features for different landmarks, resulting in ambiguous embedding spaces with mixed clusters. By contrast, Adam effectively distinguishes different anatomical landmarks from one another, yielding well-separated clusters in its learned embedding space. One can conclude that Adam preserves anatomical structures locality by capturing more discriminative features, a property that is not offered by other SSL methods. This property highlights Adam's potential to serve as a solid foundation for landmark detection applications.

Figure 5:
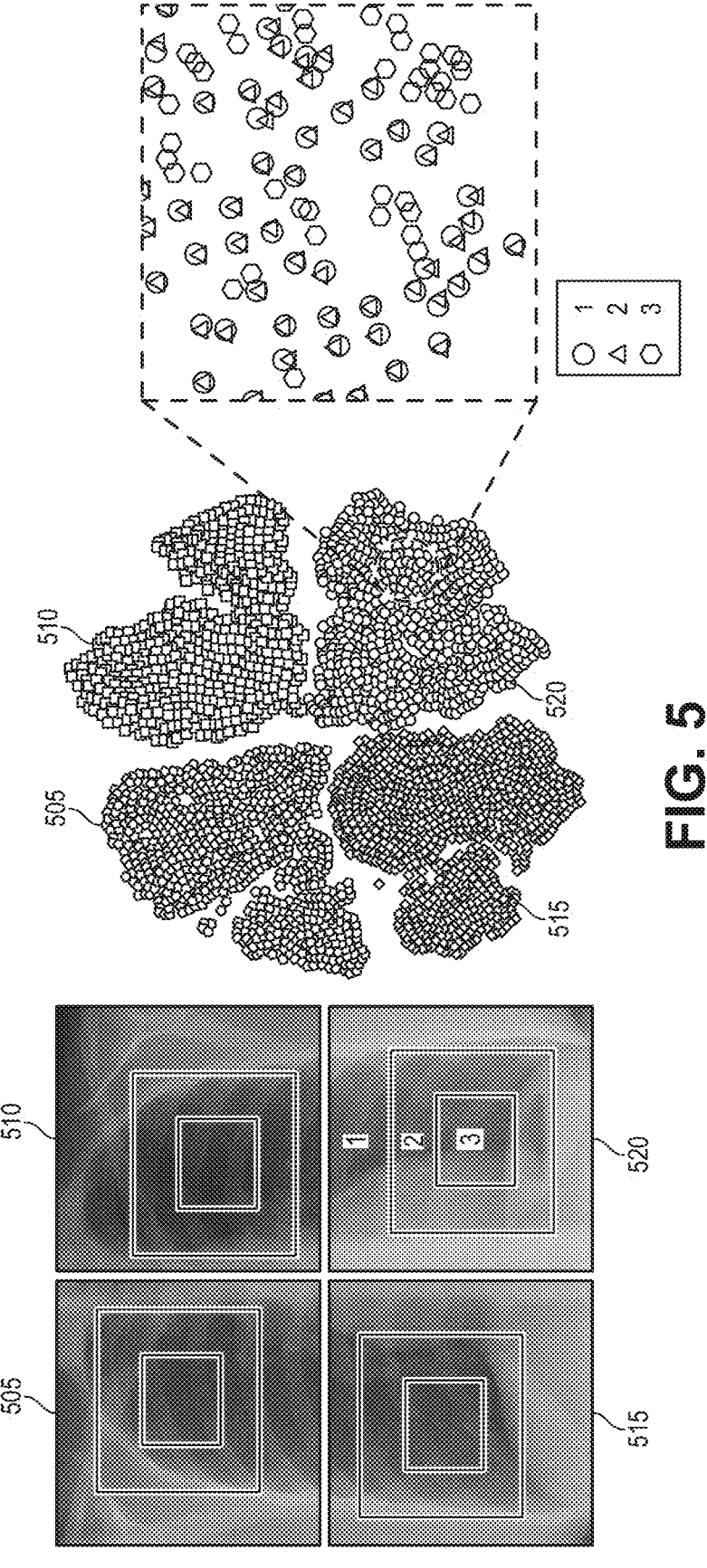
FIG. 5 depicts t-SNE visualization of hierarchical anatomical structures.

FIG. 5 depicts at 501 t-SNE visualization of hierarchical anatomical structures. Each section 505, 510, 515 and 520 denotes a distinct hierarchy of anatomical structures. Circle, triangle, and cross shapes denote instances at granularity levels 1, 2, and 3, respectively, in each hierarchy. Adam distinguishes different hierarchies, while instances at levels 1, 2, and 3 within each hierarchy are close to each other, demonstrating Adam's ability to preserve anatomical structure compositionality.

Adam Preserves Anatomical Structures Compositionality:

Setups: Adam's capability in preserving anatomical structures' compositionality in its learned embedding space was investigated. To do so, in each test image from the ChestX-ray14 dataset, the whole anatomy (i.e., chest) was first split into four non-overlapping anatomical structures, denoted as level 1. Then, from each anatomical structure in level 1, a random anatomical structure was extracted, denoted as level 2. Random anatomical structures were extracted at level 3 by repeating this approach. As a result, each of the four distinct anatomical structures at level 1 forms a hierarchy with their corresponding anatomical structures at levels 2 and 3. All anatomical structures in each level are resized to a fixed size (i.e., 224×224), and Adam's pre-trained model is used to extract their latent features. Finally, t-SNE was used to visualize the features.

Results: As seen in FIG. 5, the four distinct hierarchies of anatomical structures (depicted at 505, 510, 515 and 520) are distinguished from one another. Moreover, the representations of the anatomical structures at levels 1, 2, and 3 within each distinct hierarchy are close to each other, echoing Adam's ability to preserve anatomical structure compositionality in its learned embedding space.

Figure 6:
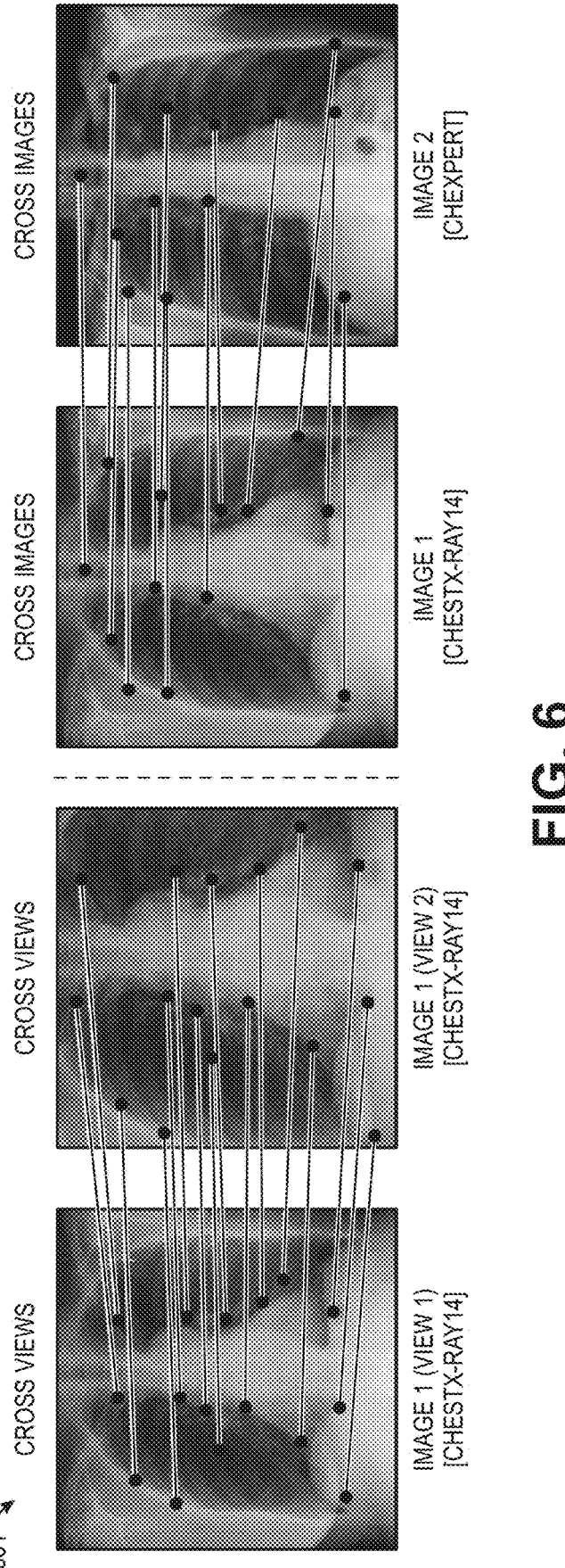
FIG. 6 depicts a visualization of dense correspondence provided by Adam across different views of the same image (left) and different images (right).

FIG. 6 depicts at 601 a visualization of dense correspondence provided by Adam across different views of the same image (left) and different images (right). Adam recognizes similar anatomical patterns across views and images.

Adam Shows Expertise without being Trained:

Setups: To further evaluate the ability of Adam in anatomy understanding, the dense correspondence is visualized between (1) two views of the same image and (2) two different images of different patients. Two views of the same image or two different images are divided into grids of patches and use Adam's pre-trained backbone to extract a set of feature vectors $F_1$ and $F_2$ for them. For each feature vector in $F_1$, it's a corresponding feature vector is found in $F_2$ based on the highest cosine similarity. Some of the high-similarity matches (i.e., similarity≥0.8) are then visualized. A match between two feature vectors is represented by a yellow line. More details and visualizations are provided below with reference to FIGS. 8 through 13.

Results: As seen at 601 in FIG. 6, Adam can find similar anatomical patterns across the different views or even across patients. Although Adam is not designed for this purpose, these results show its potential for landmark detection and image registration applications. It should be noted that one of Adam's goals is to provide generalizable models; thus, while Adam shows some potential for dense visual correspondence, more detailed investigation and comparisons with SOTA methods in this context may be incorporated into the described methodologies as future enhancements.

Figure 7:
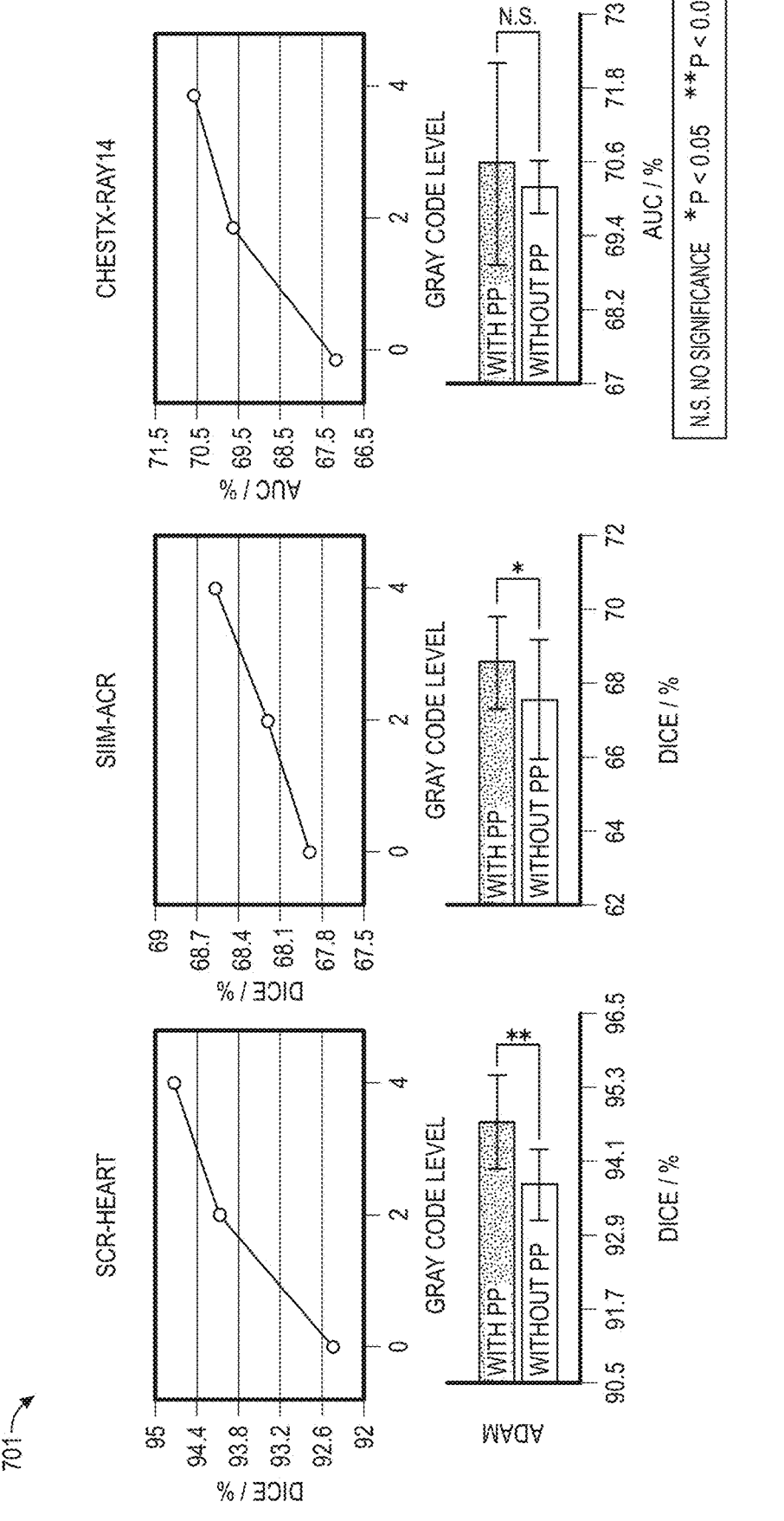
FIG. 7 depicts the various ablation studies on anatomy decomposer (top row) and purposive pruner (bottom row).

FIG. 7 depicts at 701 the various ablation studies on anatomy decomposer (top row) and purposive pruner (bottom row). Learning anatomy from coarse to fine levels improve the downstream performance. Also, purposive pruning yields significant performance improvements.

Ablation Studies:

Effect of Anatomy Decomposer: The impact of the AD 225 was investigated by gradually increasing the pretraining data granularity and monitoring downstream performance. First, Adam was trained with coarse-grained anatomy (Gray code level 0) and then the granularity of anatomical structures (up to Gray code level 4) was incrementally increased. The models were fine-tuned for three downstream tasks, encompassing classification (ChestX-ray14 with 10% labeled data) and segmentation (SIIM-ACR and SCR-Heart). As seen at 701 in FIG. 7, gradual increment of data granularity consistently improves the performance across all tasks. These findings suggest that coarse-to-fine learning strategy incrementally deepens the model's anatomical knowledge, resulting in more generalizable representations for a myriad of tasks.

Effect of Purposive Pruner: The importance of pruning the contrastive pairs during pretraining was analyzed. To do so, a model was trained without PP component 265; this model follows the default contrastive learning paradigm, which contrasts an anchor with all negative pairs in the memory bank. The downstream performances for three tasks are shown in FIG. 7. As shown, the purposive pruning strategy leads to significant performance improvements across all tasks. These improvements are attributed to better training supervision provided by PP component 265 via removing noisy contrastive pairs, which enables the model to capture more discriminative representations.

Figure 8:
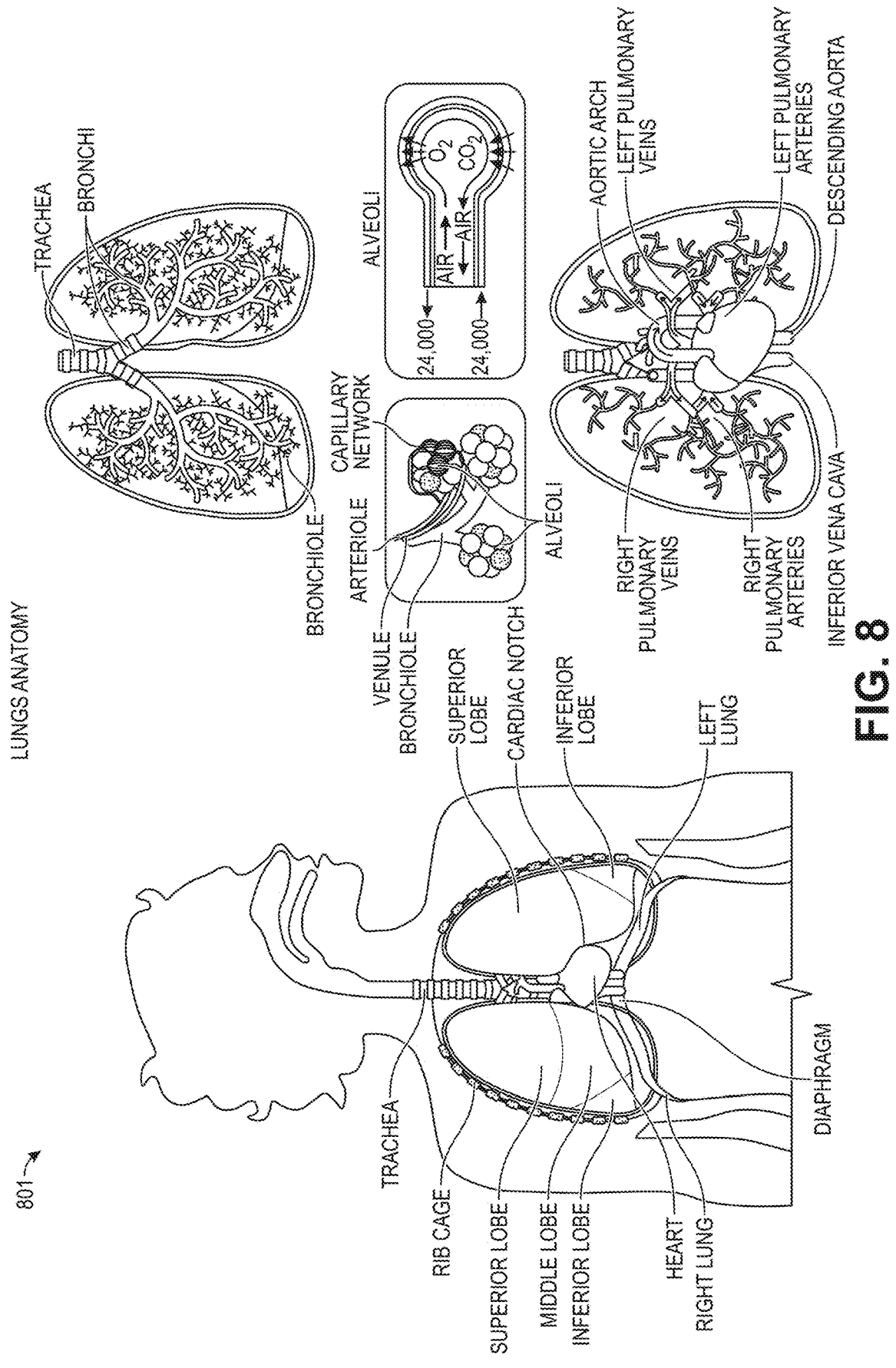
FIG. 8 depicts an anatomy of the lungs.

FIG. 8 depicts at 801 the anatomy of the lungs. Human anatomy exhibits natural hierarchies. As illustrated here, the lung is divided into the right lung and the left lung. Each lung is divided into lobes. The right lung has three lobes:

superior lobe, middle lobe, and inferior lobe; the left lung has two lobes: superior lobe and inferior lobe. The pulmonary arteries, veins, and airways form hierarchical trees. These anatomy hierarchies introduce a new concept: Gray-coded image division (refer again to FIGS. 2A, 2B, and 2C above); implemented as anatomy decomposer), leading to a training strategy (refer to FIG. 2B), which is hierarchical, autodidactic, coarse, and data-efficient, and resulting in a pretrained model (Adam), which is versatile, and yielding anatomical embedding (Eve), which is dense and semantics-rich.

Goal: As described above, the novel methodologies set forth herein provide a way forward for developing self-supervised foundation models in medical imaging via learning from human anatomy—the foundation of medical imaging.

Hypothesis: It is hypothesized that the incompetence of foundation models in medical imaging is because the existing self-supervised learning approaches lack the capabilities of "understanding" the foundation of medical imaging: human anatomy (refer to FIG. 8 which depicts anatomy of lungs, one example focused on by the examples above). Moreover, extensive experiments appear to confirm the validity of this hypothesis.

Solution: a novel self-supervised learning strategy that exploits the hierarchical nature of human anatomy and progressively learns anatomy in a coarse-to-fine manner via hierarchical contrastive learning as described in greater detail above in the section labeled "method."

Contributions: In addition to the three technical contributions listed in the section labeled "introduction," the embodiments set forth herein are the first to investigate what the term "foundation" really means and what it should mean in the context of "foundation models" for medical imaging and how leveraging that foundation alone could pave the way for developing foundation models in medical imaging.

Terminologies

Adam: The term "Adam" represents a pretrained model derived by a self-supervised training strategy. Adam can not only be used as a common basis for a range of downstream tasks via adaptation (e.g., fine-tuning), but it can also have potential to be used standalone without adaptation for other fundamental tasks in medical image analysis, such as image registration, landmark detection, and so on.

Eve: The term "Eve" represents embedding vectors generated from the pretrained Adam, having potential to be used for a myriad of tasks, including image classification, localization, and segmentation.

Figure 9:
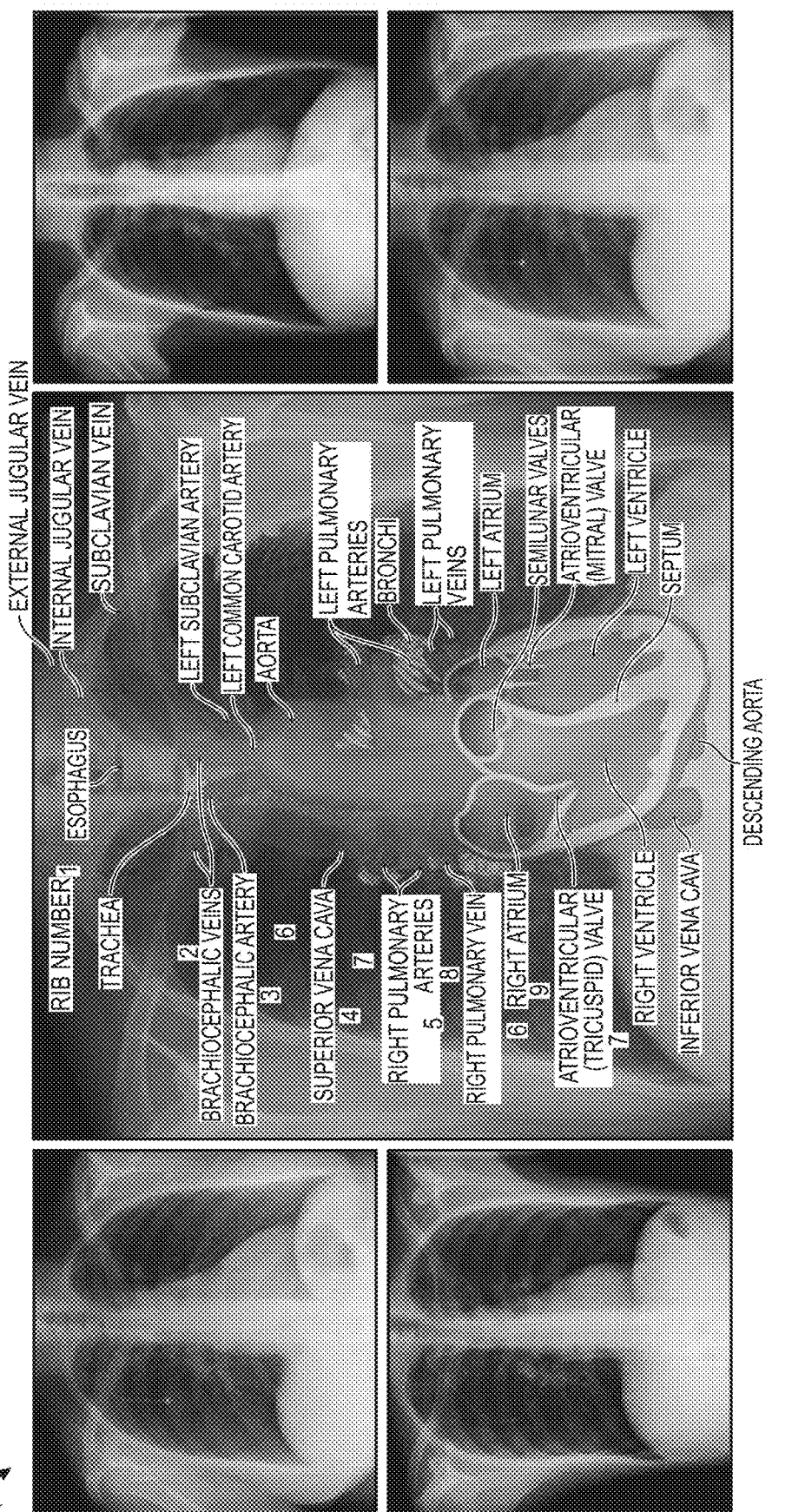
FIG. 9 illustrates the concept generally in 2D with chest X-rays.

FIG. 9 illustrates at 901 the concept generally in 2D with chest X-rays. The great similarity of the lungs in anatomy, partially annotated in the middle X-ray, across patients yields complex yet consistent and recurring anatomical patterns across X-rays. This consistency of chest X-rays in anatomy across patients has the potential to relieve the demand for a large amount of chest X-rays to train a foundation model for chest X-rays.

Properties of the Training Strategy:

Training strategy is hierarchical: To "understand" the foundation of medical imaging-human anatomy which exhibits natural hierarchies, the training strategy decomposes and perceives the anatomy progressively in a coarse-to-fine manner with the goal of not only learning anatomy's (local and global) contextual information but also their relative, hierarchical relationship.

Training strategy is autodidactic: The dominant approach in deep learning is supervised learning and offers expert-level and sometimes even super-expert-level performance, but it is not suitable for training foundation models in medical imaging, because it demands a large amount of densely annotated human anatomy for training, a requirement that is impractical to meet. Although SSL is a promising approach for mitigating this issue, existing SSL methods are incapable of "understanding" the anatomy (refer again to FIG. 4 above). To overcome these two deficiencies, therefore, this new training strategy is developed to unlock the underlying structure (foundation) of medical image data via self-supervision.

Training strategy is coarse: To generate dense anatomical embedding, one would expect that pixel-level pretraining would be needed; but this training strategy may be inefficient and susceptible to noise. To mitigate this issue, the training strategy attempts to learn anatomy at a coarser-grained level first, then uses this knowledge as effective contextual clues for learning more fine-grained anatomical structures, resulting in dense anatomical embedding.

Training strategy is data-efficient: To provide dense anatomical embedding, one would expect that large-scale (labeled and/or unlabeled) data would be required, a process that is laborious and tedious in medical imaging. To alleviate this issue, the learning strategy takes the first step by focusing on unlocking the underlying structure of medical images—understanding the anatomy. Intuitively, given the fundamental similarity of medical images in terms of anatomy under a particular imaging protocol, such as the chest X-rays as set forth by FIG. 9, scaling data in medical imaging does not seem critical in diversifying image data in terms of anatomy.

Thus, it is hypothesized that in medical imaging, training strategy should take precedence over merely scaling up data or simply utilizing larger architecture because one must first unlock the underlying structure (foundation) of data; unlocking the foundation of medical imaging through an effective training strategy may result in a better understanding of human anatomy, paving the way for learning optimal dense anatomical embedding. This has been corroborated by the capabilities and properties of Adam and those of Eve. Such capabilities and properties exceeded expectations because only NIH ChestX-Ray14 was utilized for training. With access to nearly 1M chest X-rays, nevertheless, one would expect much stronger capabilities and plan to investigate the effects of scaling-up data and architectures on Adam and Eve as future work.

Properties of Adam:

Adam is versatile: The pretrained Adam model was fine-tuned in a myriad of tasks; the results demonstrate the generality and adaptability of Adam pretrained model in (i) performance boosts, (ii) accurate disease localization, and (iii) label efficiency in a variety of tasks.

Adam shows new capabilities for few-shot segmentation: As described in greater detail below and as is presented by Table 3 as set forth at 1003 in FIG. 10C, for segmenting SCR-Heart and SCR-Clavicle, Adam outperforms the SOTA methods by at least 13% and 29%, respectively, in 5 shots and by at least 14% and 17%, respectively, in 10 shots. With only 10 training samples, Adam can reach 95% of its (full) performance (i.e., using whole training data). With such an exceptional performance Adam distinguishes itself dramatically from the SOTA SSL methods, exceeding expectations.

Emerging Properties of Eve:

Eve is dense: To achieve anatomy understanding, as the first step, a foundation model should be able to convert each pixel in an image (e.g., a chest X-ray) into an embedding—a semantics-rich numerical vector, where different anatomical structures are associated with different embeddings, and the same anatomical structures have (nearly) identical embeddings at all resolutions and scales across patients. Eve generated by Adam possesses these properties. As illustrated in FIG. 5, for an anatomical structure, Eve provides (nearly) identical embeddings at three different resolutions. Furthermore, Eve not only can recognize similar anatomical structures across patients but also can distinguish different structures (within/across the same patient), as shown in FIG. 4.

Eve is semantics-rich: Further properties of Eve include: (a) Eve reveals locality as illustrated in FIG. 4 and (b) Eve preserves compositionality as illustrated in FIG. 5.

Figure 10A:
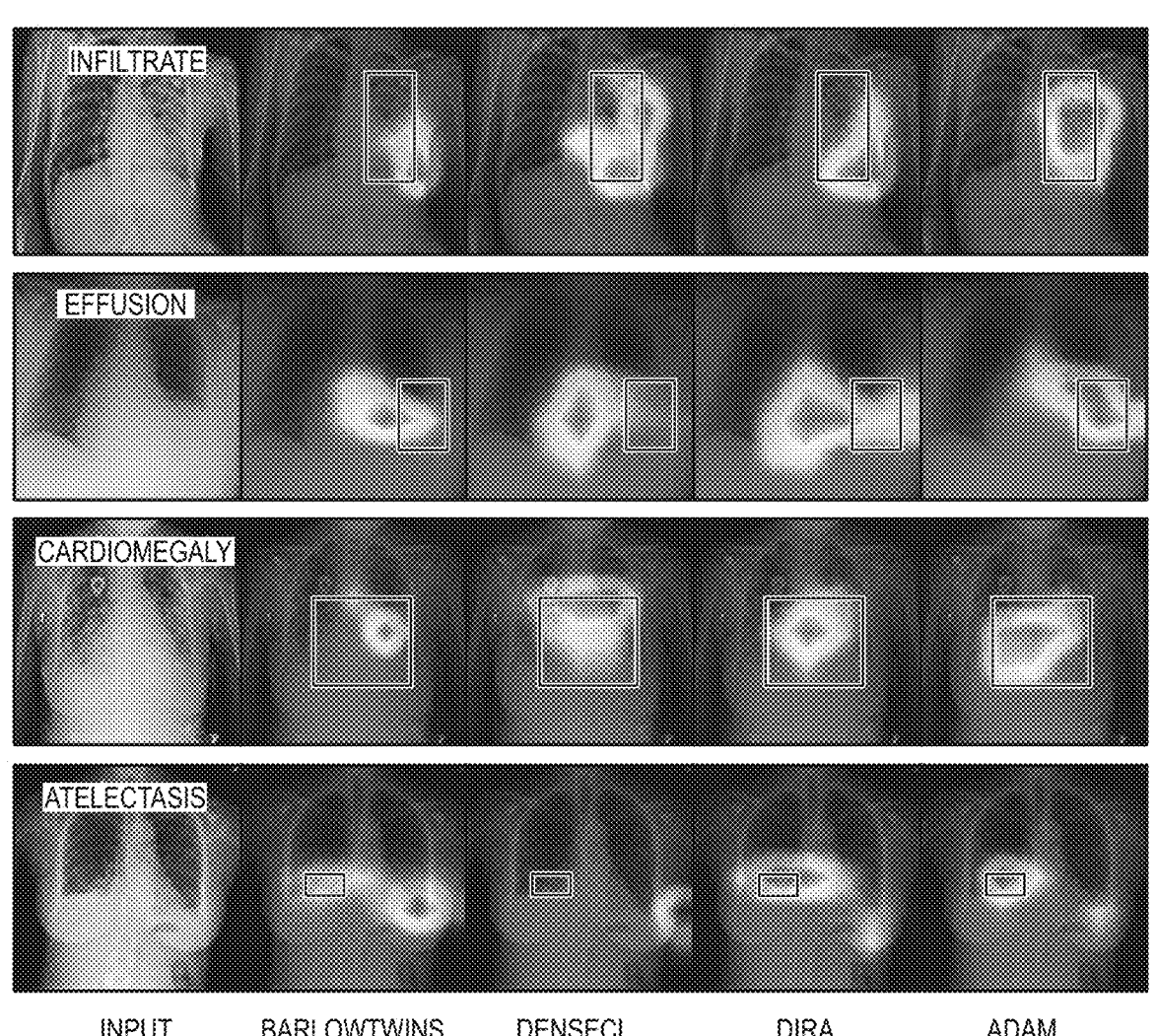
FIGS. 10A and 10B shows Grad-CAM heatmaps in which the embedded white boxes show the ground truth.
Figure 10B:
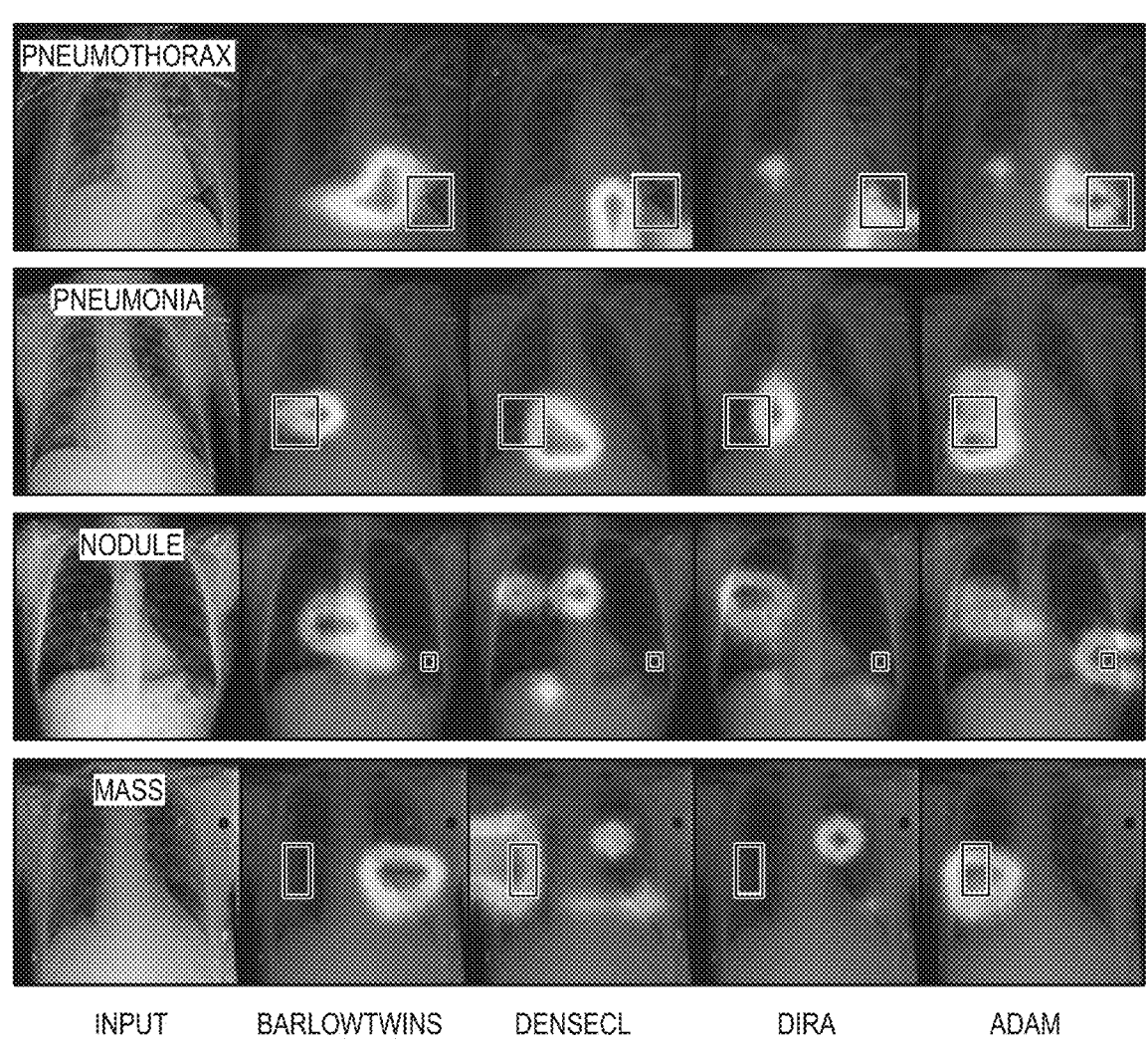

FIGS. 10A and 10B show at 1001 and 1002 respectively Grad-CAM heatmaps in which the embedded white boxes show the ground truth. Each panel in FIGS. 10A and 10B shows GradCAM heatmaps for Adam and other SSL methods in different diseases the concept generally in 2D with chest X-rays. The great similarity of the lungs in anatomy, partially annotated in the middle X-ray, across patients yields complex yet consistent and recurring anatomical patterns across X-rays. This consistency of chest X-rays in anatomy across patients has the potential to relieve the demand for a large amount of chest X-rays to train a foundation model for chest X-rays.

FIG. 10C depicts Table 3 (element 1003) which shows a few-shot transfer on two medical segmentation tasks. Fine-tuning Adam provides outstandingly better transfer performance compared with SSL methods on all tasks with few labeled data.

Few-Shot Segmentation:

Setups: The generalizability of Adam's representation on downstream tasks in the few-shot regime was evaluated. Experiments were conducted on two segmentation tasks in SCR-Heart and SCR-Clavicle datasets. The pretrained models were fine-tuned with a small number of labeled samples (i.e., 5-shot and 10-shot) from each dataset. The mean Dice metric was used to evaluate the segmentation performance in both tasks. Adam was compared with the best-performing SSL methods from each baseline group (i.e., instance-level, patch-level, and pixel-level) based on the results of Table 1 as set forth at FIG. 3A.

Results: As shown in Table 3 as presented at FIG. 10C, Adam significantly outperforms the SSL baselines in both 5-shot and 10-shot transfer settings. In particular, compared with SSL baselines, Adam provides improved performance by at least 13% and 29% in 5-shot transfer in SCR-Heart and SCR-Clavicle, respectively. Similarly, Adam yields performance boosts by at least 14% and 17% in 10-shot transfer in SCR-Heart and SCR-Clavicle, respectively. Moreover, the results demonstrate that with 10 training samples, Adam reaches 95% of its performance using full training data in both SCR-Heart and SCR-Clavicle. These results demonstrate Adam's potential to perform few-shot medical segmentation tasks, eliminating the need for a large set of training datasets.

Weakly-supervised localization: Further provided here are qualitative results for the setting of weakly-supervised disease localization.

Setups: Heatmaps were calculated using GradCAM to approximate the spatial location of a particular disease. Adam was compared with the best performing SSL methods from each baseline group (i.e., instance-level, patch-level, and pixel-level) based on the results of Table 1 as set forth at FIG. 3A.

Results: As is depicted at FIGS. 10A and 10B, there are examples of GradCAM for Adam and other SSL baselines in eight thoracic diseases, including Atelectasis, Cardiomegaly, Effusion, Infiltrate, Mass, Nodule, Pneumonia, Pneumothorax. As shown, Adam captures the diseased areas more precisely than the baselines. In particular, SSL baselines' attention maps either focus on larger image regions or don't overlap with the ground truth, whereas Adam provides more robust localization results across all diseases. These findings highlight Adam's ability to learn dense representations that are more useful for disease localization.

Figure 11:
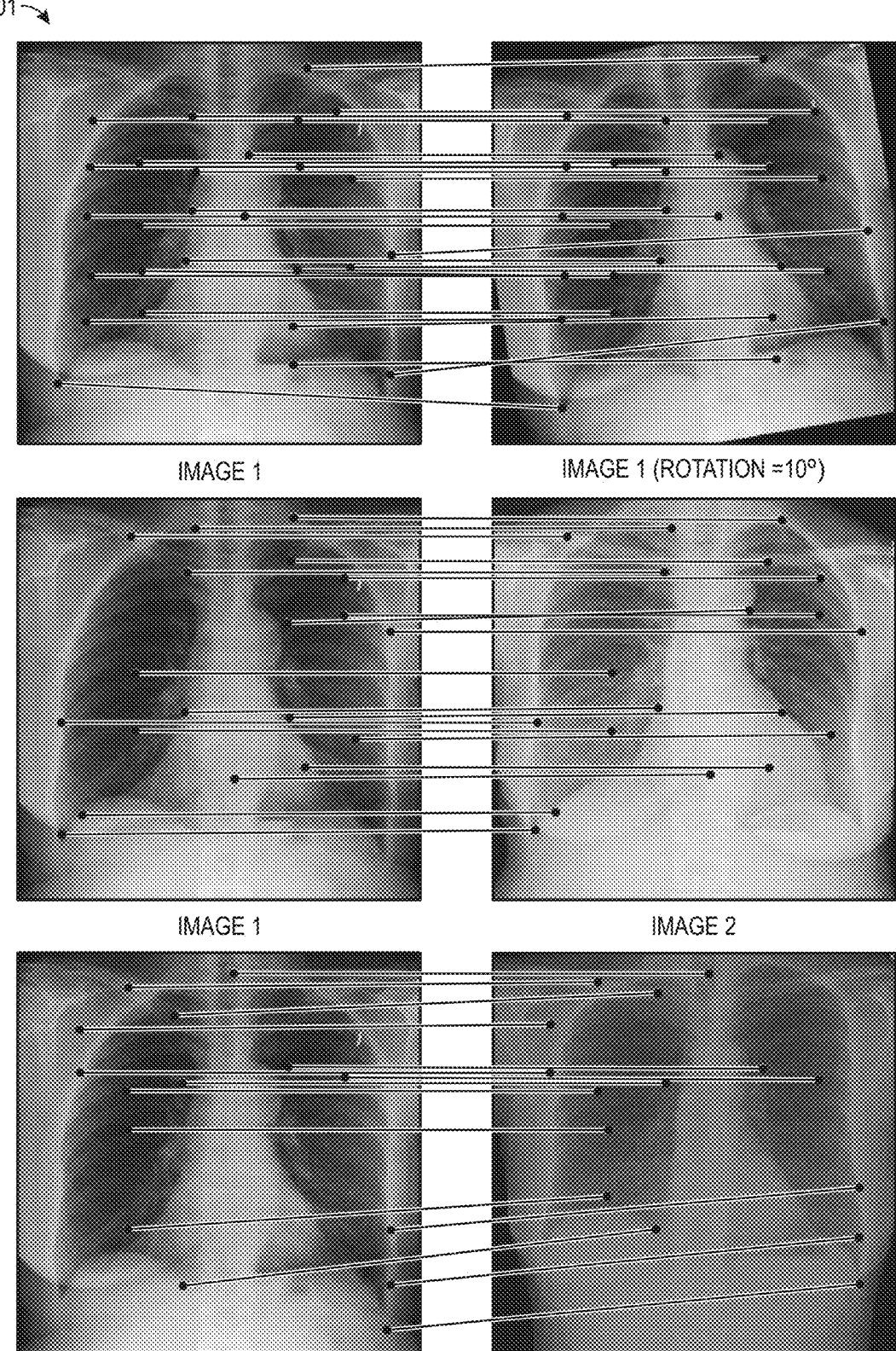
FIG. 11 provides a visualization of dense correspondence through Eve provided by Adam across different views of the same image (first row) and different patients with diversity in intensity distribution and organs' appearance (second and third rows).

FIG. 11 provides at 1101 a visualization of dense correspondence through Eve provided by Adam across different views of the same image (first row) and different patients with diversity in intensity distribution and organs' appearance (second and third rows).
Dense Correspondence Visualization: Further Provided Here are Additional Dense Correspondence Visualization Results.

Setups: The robustness of Adam's representations were further evaluated to (i) image augmentations and (ii) variations in appearance, intensity, and texture of anatomical structures caused by inter-subject differences or data distribution shifts. To do so, following the described above, the dense correspondence was visualized between (i) an image and its augmented view produced by rotation (10 degrees) and (ii) images of different patients with considerable diversity in intensity distribution, texture, and organs' shape. For clarity of figures, only some of the high-similarity matches are shown.

Results: As is depicted at FIG. 11, Adam can match a variety of anatomical structures effectively in the presence of rotation as well as variations in shape, intensity, and texture across images. Putting these results at FIG. 11 as well as the results as set forth at FIGS. 4 and 6, one can conclude that Adam learns robust anatomical representations, mapping semantically similar anatomical structures, regardless of their subtle differences in shape, intensity, and texture, to similar embeddings.

A vision for foundation models in medical imaging: In order to address various naming issues associated with terms such as pretrained model, self-supervised model, language model, and task-agnostic model, The term foundation models is used to collectively refer to "models (e.g., BERT, DALL-E, GPT-3) that are trained on broad data at scale and are adaptable to a wide range of downstream tasks" to capture the power, risks, and paradigm shift enabled by these models. It is believed that foundation models will profoundly impact computer-aided diagnosis in medical imaging.

There is no precise definition of foundation models in medical imaging; therefore, it is unclear how to determine if a model is a foundation model. For example, prior techniques did not claim their pretrained models to be foundation models, while others considered them "chest Xray foundation models" and investigated their potential risk of bias. Indeed, others have cautioned that, at present, " . . . we do not fully understand the nature or quality of the foundation that foundation models provide; we cannot characterize whether the foundation is trustworthy or not."

Although it might not be necessarily the original intentions, the SSL methods developed for NLP, such as masking language modeling, have proven to be powerful in capturing the underlying structures (foundation) of the English language, thereby a number of intrinsic properties of the language emerge naturally.

Therefore, it is believed that a successful foundation model for medical imaging must be consciously and intentionally built on the foundation of medical imaging from the very start to be trustworthy in medical imaging, and the built foundation models must possess unique properties fundamental to medical imaging.

Thus, the foundation of medical imaging is human anatomy.

Building a foundation model on the foundation of medical imaging means the model must "understand" human anatomy in medical imaging to gain certain unique properties fundamental to medical imaging.

Given that one of the most prominent characteristics of human anatomy is its hierarchical nature (refer again to FIG. 8), the first step is exploiting the anatomical hierarchies, leading to a new concept: Gray-coded image division. However, densely annotating human anatomy by experts for training models to understand human anatomy via supervised learning is impractical; therefore, foundation models must be trained via self-supervised learning.

It is appreciated that the Gray-coded image division offers anatomical diversity inherently and can help achieve dense anatomical embedding without training at the pixel level.

Furthermore, if one focuses on one particular imaging protocol (e.g., chest X-ray or chest CT for pulmonary embolism) at a time, the consistency of the images acquired with this imaging protocol in terms of anatomy across patients has the potential to dramatically relieve the demand for a large number of images to train a foundation model for this imaging protocol. For example, as experiments show, the consistency of chest X-rays in lung anatomy across patients can reduce the number of chest X-rays required to train such a model for chest X-rays (refer again to FIG. 9).

This line of exploration provides a training strategy, which is hierarchical, autodidactic, coarse, and data-efficient.

Using the described training strategy, a model (called Adam) was trained which generated dense anatomical embedding (nicknamed Eve). It was observed from experiments that Adam and Eve show some unique capabilities and interesting properties, some of which are expected, for example, locality (refer again to FIG. 4) and compositionality (refer again to FIG. 5), and they also show some capabilities and properties that exceeded expectations: (1) few-shot segmentation (refer again to Table 3 as set forth at FIG. 10C), (2) focused localization (refer again to FIG. 10), and (3) dense anatomical correspondence (refer again to FIGS. 6 and 11).

As for the steps to take towards a foundation model in medical imaging, the model pretrained with our pretraining strategy (Adam) may be considered a first step towards foundation models in medical imaging, with more work to do to create a true foundation model for medical imaging.

For example, while Adam can be fine-tuned to empower annotation-efficiency for segmentation and classification (refer again to FIGS. 3A, 3B, and 3C), make localization more focused (refer again to FIG. 10) and offer potential few-shot segmentation capabilities (refer again to Table 3 as set forth at FIG. 10C), Eve may be further incorporated into an encoder or the decoder of a U-Net architecture to improve classification, localization, and segmentation because of Eve's semantic richness.

The pretraining strategy and pretraining scale are both substrates of foundation models. The above discussion concentrates on the pretraining strategy because it is believed that a good learning strategy that understands human anatomy will blaze a trail for foundation models in medical imaging. There is no doubt, however, that large-scale data will be better utilized with a good learning strategy and, it is believed that investigating larger architectures, such as transformers that use a large number of unlabeled medical images, is worthwhile.

Earlier models were based on roughly 800K chest X-rays. Models based on 1M chest X-rays are expected to make Adam and Eve much stronger. It is contemplated that Adam can be extended to cover all major imaging modalities and imaging protocols.

Figure 12:
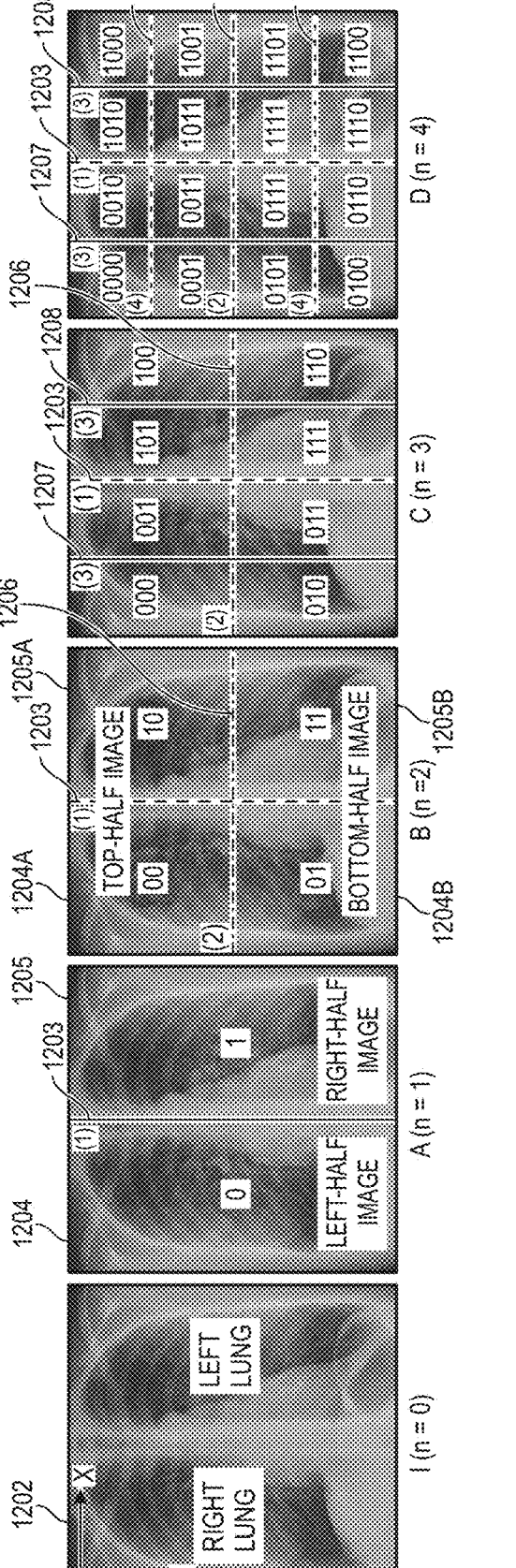
FIG. 12 depicts exemplary gray-coded image division techniques.

FIG. 12 depicts at 2101 exemplary gray-coded image division techniques.

Gray-coded image division: Further to the Gray code generation discussed previously, more details are provided by this section. For simplicity and clarity, Gray code level 4 (i.e., n=4) was chosen to illustrate the recursive generation of Gray codes. As shown in FIG. 12, an image I 1202 is divided in half along a vertical axis 1203 depicted in image A of FIG. 12. The left-half image 1204 and the right-half image 1205 are encoded with 0 and 1, respectively. Given the chest X-ray imaging protocol and the consistency of human anatomy, the right lung is mostly in the left-half image 1204 and the left lung in the right-half image 1205. Then, each image 1204 and 1205 is divided along a horizontal axis 1206 (seen in image B of FIG. 12) and the top-half parts 1204A and 1205A, and the bottom-half parts 1204B and 1205B, are encoded with 0 and 1, respectively. In this way, for each of the resulting two top parts 1204A and 1205A, a 0 is added to the end (i.e., right-most bit location) of the 2-bit code value of their respective parts. Similarly, for each of the resulting two bottom parts 1204B and 1205B, a 1 is added to the end of the 2-bit code value of their respective parts (the second digits in image B of FIG. 12). The image parts are further divided along vertical axes 1207 and 1208 (seen in image C of FIG. 12). For each of the resulting parts, alternating patterns (0 and 1) or (1 and 0) are added to the end of the 3-bit code of their respective parts (third digits in image C of FIG. 12). This process is repeated (see horizontal axes 1209 and 1210) to generate the 4-bit Gray codes (seen in image D of FIG. 12). The process can continue the division until desired resolution is reached.

From a technical standpoint, Gray codes are used in the training strategy as location identifiers, which uniquely identify anatomical structures, to effectively and efficiently prune the memory bank during pretraining to enhance model robustness. However, it is appreciated that there are numerous ways to accomplish this, such as using coordinate systems.

Regardless of scalability and computational complexity issues that may arise in other possible approaches compared to Gray code the two following points are noted:

Firstly, the goal of introducing Gray code is not simply to use it for location identification per se, but rather to pave the way for the development of foundation models in medical imaging. Indeed, the Gray-coded image division approach described herein not only captures the relative, hierarchical relationships of anatomical structures in medical images but also encodes anatomical structures across medical images; this would blaze the way for the model to "understand" human anatomy in medical imaging to gain certain fundamental properties of medical imaging. It is contemplated that by leveraging the Gray code in a more intelligent manner, its enormous potential for facilitating foundation model development in medical imaging will be unlocked even further—achieving dense anatomical embedding without training at the pixel level.

Secondly, it should be emphasized that the self-supervised training strategy is a general approach. Indeed, the training strategy aims to unlock the foundation of medical imaging—learning human anatomy—by (i) gradually decomposing the anatomy and (ii) providing a more accurate supervision signal for contrastive learning of anatomical structures by removing false negatives. While the simple, low computational complexity, yet scalable Gray code enables a training strategy to achieve its goal effectively and efficiently, other location encoding approaches can be used in a general training schema.

FIG. 13 depicts at 1301 a purposive pruner identified as Algorithm 1, which presents the details of the purposive pruner (PP) component 265. In Algorithm 1, reference to the "yellow line" and "blue line" refer to the horizontal and vertical lines in FIG. 12 that divide the image in half along the horizontal axis and vertical axis, respectively.

Datasets and Downstream Tasks:

ChestX-ray14—multi-label classification: ChestX-ray14 dataset provides 112K chest radiographs taken from 30K unique patients, along with 14 thoracic disease labels. Each individual image may have more than one disease label. The downstream task is a multi-label classification in which the models are trained to predict 14 diseases for each image. The official patient-wise split released by the dataset is used, including 86K training images and 25K testing images. A mean AUC over 14 diseases is used to evaluate the multi-label classification performance.

ChestX-ray14—weakly supervised localization: ChestXray14 dataset, in addition to image-level disease labels, provides bounding box annotations for nearly 1,000 test images. Of this set of images, bounding box annotations are available for eight out of fourteen diseases. In a weakly-supervised localization downstream task, only image-level disease labels are used for training the models. The images with bounding box annotations are only used during the testing phase to evaluate the localization accuracy. The mean accuracy over eight diseases is reported to evaluate the localization performance.

NIH Shenzhen CXR—binary classification: NIH Shenzhen CXR dataset provides 662 frontal-view chest radiographs, among which 326 images are normal and 336 images are patients with tuberculosis (TB) disease. The downstream task is a binary classification in which the models are trained to detect TB in images. The dataset is randomly divided into a training set (80%) and a test set (20%). The AUC score is reported to evaluate the classification performance.

SIIM-ACR—lesion segmentation: SIIM-ACR dataset provides 10K chest radiographs, including normal cases and cases with pneumothorax disease. For diseased cases, pixel-level segmentation masks are provided. The downstream task is pneumothorax segmentation. The dataset is randomly divided into training (80%) and testing (20%). The mean Dice score is used to evaluate segmentation performance.

ChestX-Det—lesion segmentation: ChestX-Det dataset consists of 3,578 images from ChestX-ray14 dataset. This dataset provides segmentation masks for 13 thoracic diseases, including atelectasis, calcification, cardiomegaly, consolidation, diffuse nodule, effusion, emphysema, fibro fibrosis, fracture, mass, nodule, pleural thickening, and pneumothorax. The images are annotated by 3 board-certified radiologists. The downstream task is pixel-wise segmentation of abnormalities in images. The dataset is randomly divided into training (80%) and testing (20%). The mean IoU score is used to evaluate the segmentation performance.

SCR-Heart&Clavicle—anatomical structure segmentation: SCR dataset provides 247 posterior-anterior chest radiographs from JSRT database along with segmentation masks for the heart, lungs, and clavicles. The data has been subdivided into two folds with 124 and 123 images. The official split of the dataset is followed, using fold1 for training (124 images) and fold2 for testing (123 images). The mean Dice score is used to evaluate the heart and clavicles segmentation performances.

Implementation details—Pretraining protocol: In the training strategy, a standard ResNet-50 is used as the backbone (i.e., $f_\theta$ and $f_\xi$) in accordance with standard protocol. Any other sophisticated backbones (i.e., variants of convolutional neural networks or vision transformers) can, however, be leveraged in the proposed training strategy. As stated above, the process carefully controls confounding factors, particularly backbone architecture, to dissect the importance of training strategy in blazing the way for developing foundation models in medical imaging. The settings for prior known AI models is followed for the training parameters, including the architecture of projection head (i.e., $h_\theta$ and $h_\xi$), memory bank size (i.e., K), contrastive temperature scaling (i.e., r), and momentum coefficient.

Coarse-to-fine pretraining: Adam is trained by gradually increasing the pretraining data granularity at each training stage. In particular, at each training stage n, the anatomy decomposer (AD) component 225 decomposes the anatomy within medical images into a hierarchy of parts with granularity level n (refer again to FIGS. 2A, 2B, and 2C), which is used as the model's input; consequently, the model is trained to distinguish different anatomical structures at granularity level n. The training strategy enables the model to use previously acquired knowledge as effective contextual clues for learning more fine-grained anatomical structures at later stages.

The process starts with n=0 and trains the model for a number of steps with whole images. At this stage, the model learns to distinguish the global anatomy among different patients. As a result, the model is initially equipped with a high-level understanding of the entire anatomy. The process then continues with n=1 and trains the model with anatomical structures with granularity level 1; the model learns to distinguish different anatomical structures with level 1. The process continues the training process up to n=4, where anatomical structures with granularity level 4 are used as the input to train the model. At each training stage n, the process trains the model for 200 epochs; in all training stages, the model is trained with the objective function presented in Equation 1 above. the process is limited the training to n=4 due to computational constraints; but the process can continue with finer data granularity levels.

Fine-tuning protocol: Adam's pretrained backbone (i.e., $f_\theta$) is transferred to downstream tasks. For all downstream tasks, the process uses input image resolution 224×224. To prevent overfitting, the process uses early-stopping using 10% of the training data as the validation set in all downstream tasks. The process optimizes each downstream task with the best-performing hyperparameters as follows: (i) for downstream classification tasks, the process uses standard data augmentation techniques, including (1) random rotation by (−7, 7) degree, (2) random crop, and (3) random horizontal flip with probability 0.5.

The models are trained using Adam optimizer with a learning rate 0.0002 and ReduceLROnPlateau learning rate decay scheduler; (ii) for downstream segmentation tasks, the process uses standard data augmentation techniques, including (1) random gamma, (2) elastic transformation, (3) random brightness contrast, (4) optical distortion, and (5) grid distortion. The process trains the models using Adam optimizer with a learning rate 0.001 and cosine learning rate decay scheduler.

To overcome the current SSL's inability to "understand" the foundation of medical imaging human anatomy, set forth herein is a novel training strategy (Adam) based on hierarchical self-supervised contrastive learning. Extensive experiments show that the learned representation of SSL Adam is not only versatile: it has generality and adaptability in a wide range of tasks, but it is also semantics meaningful: it learns anatomy by reflecting the locality and compositionality of anatomical structures in its embedding space, which is essential for anatomy comprehension.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
receiving medical images;
extracting human anatomical structures from the received medical images;
training a foundation model, via a self-supervised machine learning process that learns the human anatomical structures, resulting in generic representations of the human anatomical structures, wherein the self-supervised machine learning process that learns the human anatomical structures comprises:
executing a self-supervised contrastive learning framework to conserve hierarchical relationships of the human anatomical structures in the received medical images and to capture distinct representations for different human anatomical structures at different granularity levels, and wherein executing the self-supervised contrastive learning framework comprises:
executing an anatomy decomposer (AD) that decomposes anatomy in the received medical images into hierarchical relationships of the human anatomical structures at different granularity levels; and
executing a purposive pruner (PP) to capture distinct representations of the human anatomical structures at different granularity levels; and
processing, using the generated foundation model, medical images that form no part of the received medical images used in training the generated foundation model.

2. The method of claim 1, wherein the self-supervised machine learning process that learns the human anatomical structures comprises the self-supervised machine learning process learning prominent objects in the received medical images corresponding to the human anatomical structures.

3. The method of claim 2, wherein the self-supervised machine learning process that learns the human anatomical structures further comprises the self-supervised machine learning process learning detailed parts within the learned prominent objects corresponding to sub-portions of the generic representations of the human anatomical structures.

4. A system comprising:

a memory to store instructions;

a processor to execute the instructions stored in the memory to perform the following operations:

receiving medical images;

extracting human anatomical structures from the received medical images;

training a foundation model, via a self-supervised machine learning process that learns the human anatomical structures, resulting in generic representations of the human anatomical structures, wherein the self-supervised machine learning process that learns the human anatomical structures comprises:

executing a self-supervised contrastive learning framework to conserve hierarchical relationships of the human anatomical structures in the received medical images and to capture distinct representations for different human anatomical structures at different granularity levels, and wherein executing the self-supervised contrastive learning framework comprises:

executing an anatomy decomposer (AD) that decomposes anatomy in the received medical images into hierarchical relationships of the human anatomical structures at different granularity levels; and executing a purposive pruner (PP) to capture distinct representations of the human anatomical structures at different granularity levels; and processing, using the generated foundation model, medical images that form no part of the received medical images used in training the generated foundation model.

5. The system of claim 4, wherein the self-supervised machine learning process that learns the human anatomical structures comprises the self-supervised machine learning process learning prominent objects from within the medical images received corresponding to the human anatomical structures.

6. The system of claim 5, wherein the self-supervised machine learning process that learns the human anatomical structures further comprises the self-supervised machine learning process learning detailed parts within the learned prominent objects corresponding to sub-portions of the generic representations of the human anatomical structures.

7. A non-transitory computer readable storage media having instructions stored thereupon that, when executed by a system having at least a processor and a memory therein, the instructions cause the processor to perform operations including:

receiving medical images;

extracting human anatomical structures from the received medical images;

training a foundation model, via a self-supervised learning process that learns the human anatomical structures, resulting in generic representations of the human anatomical structures, wherein the self-supervised learning process that learns the human anatomical structures comprises:

executing a self-supervised contrastive learning framework to conserve hierarchical relationships of the human anatomical structures in the received medical images and to capture distinct representations for different human anatomical structures at different granularity levels, and wherein executing the self-supervised contrastive learning framework comprises:

executing an anatomy decomposer (AD) that decomposes anatomy in the received medical images into hierarchical relationships of the human anatomical structures at different granularity levels; and executing a purposive pruner (PP) to capture distinct representations of the human anatomical structures at different granularity levels; and processing, using the generated foundation model, medical images that form no part of the received medical images used in training the generated foundation model.

8. The non-transitory computer readable medium of claim 7, wherein the self-supervised machine learning process that learns the human anatomical structures comprises the self-supervised machine learning process learning prominent objects in the received medical images corresponding to the human anatomical structures.

9. The non-transitory computer readable medium of claim 8, wherein the self-supervised machine learning process that learns the human anatomical structures further comprises the self-supervised machine learning process learning detailed parts within the learned prominent objects corresponding to sub-portions of the generic representations of the human anatomical structures.

\* \* \* \* \*